United States Patent
Mazaki et al.

(10) Patent No.: US 7,732,024 B2
(45) Date of Patent: Jun. 8, 2010

(54) HOMEOTROPIC ALIGNMENT LIQUID CRYSTAL FILM, OPTICAL FILM COMPRISING THE SAME, AND IMAGE DISPLAY DEVICE

(75) Inventors: Hitoshi Mazaki, Yokohama (JP); Takashi Seki, Yokohama (JP); Takuya Matsumoto, Yokohama (JP); Tetsuya Uesaka, Yokohama (JP); Akio Mutou, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 218 days.

(21) Appl. No.: 11/781,460

(22) Filed: Jul. 23, 2007

(65) Prior Publication Data
US 2007/0263152 A1 Nov. 15, 2007

Related U.S. Application Data

(63) Continuation of application No. PCT/JP2006/301607, filed on Jan. 25, 2006.

(30) Foreign Application Priority Data

| Feb. 8, 2005 | (JP) | 2005-032238 |
| May 31, 2005 | (JP) | 2005-160214 |
| Jul. 6, 2005 | (JP) | 2005-198089 |
| Sep. 7, 2005 | (JP) | 2005-259838 |

(51) Int. Cl.
    *G02F 1/1337* (2006.01)
    *G02F 1/1335* (2006.01)
(52) U.S. Cl. .......... 428/1.3; 349/118; 349/130
(58) Field of Classification Search ........... 428/1.1–1.2; 349/117–118, 123–136; 252/299.01, 299.66–299.68
See application file for complete search history.

(56) References Cited

U.S. PATENT DOCUMENTS

| 5,245,456 | A | | 9/1993 | Yoshimi et al. |
| 5,456,867 | A | * | 10/1995 | Mazaki et al. ............... 264/2.6 |
| 5,504,603 | A | * | 4/1996 | Winker et al. ............... 349/117 |
| 5,528,400 | A | * | 6/1996 | Arakawa ..................... 349/117 |
| 6,081,312 | A | * | 6/2000 | Aminaka et al. ............ 349/118 |
| 6,606,140 | B1 | | 8/2003 | Ito et al. |
| 6,671,031 | B1 | * | 12/2003 | Nishimura .................. 349/201 |
| 6,970,214 | B2 | * | 11/2005 | Sato et al. ..................... 349/96 |
| 7,090,901 | B2 | * | 8/2006 | Chien et al. .................. 428/1.3 |
| 7,101,595 | B2 | * | 9/2006 | Shundo et al. ............... 428/1.1 |
| 7,125,590 | B2 | * | 10/2006 | Matsumoto et al. .......... 428/1.3 |
| 7,135,211 | B2 | * | 11/2006 | Shuto et al. .................. 428/1.3 |

(Continued)

FOREIGN PATENT DOCUMENTS

EP 0465133 A2 1/1992

(Continued)

*Primary Examiner*—Sophie Hon
(74) *Attorney, Agent, or Firm*—Panitch Schwarze Belisario & Nadel LLP

(57) ABSTRACT

A homeotropic alignment liquid crystal film is provided with a liquid crystalline substance containing a side chain liquid crystalline compound having an oxetanyl group, as a constituent, aligned homeotropically on an alignment substrate while being in a liquid crystal state and fixed in the homeotropic alignment by allowing the oxetanyl group to react. Thus, the homeotropic alignment liquid crystal film can be stably produced without necessitating a complicated step such as light irradiation under an inert gas atmosphere and is excellent in alignment retainability after being fixed in the homeotropic alignment and in mechanical strength.

3 Claims, 12 Drawing Sheets

U.S. PATENT DOCUMENTS

| | | | |
|---|---|---|---|
| 7,175,889 B2 * | 2/2007 | Ohkawa et al. | 428/1.1 |
| 2002/0036739 A1 * | 3/2002 | Shuto et al. | 349/123 |
| 2002/0041352 A1 * | 4/2002 | Kuzuhara et al. | 349/117 |
| 2002/0196397 A1 * | 12/2002 | Takahashi et al. | 349/115 |
| 2003/0137627 A1 * | 7/2003 | Ito et al. | 349/117 |
| 2004/0051831 A1 * | 3/2004 | Su Yu et al. | 349/117 |
| 2004/0151846 A1 * | 8/2004 | Aminaka et al. | 428/1.3 |
| 2004/0169792 A1 * | 9/2004 | Sato et al. | 349/102 |
| 2004/0228983 A1 * | 11/2004 | Chien et al. | 428/1.1 |
| 2004/0241344 A1 * | 12/2004 | Kawanishi et al. | 428/1.1 |
| 2004/0263736 A1 * | 12/2004 | Graham et al. | 349/127 |
| 2005/0037155 A1 * | 2/2005 | Shuto et al. | 428/1.1 |
| 2005/0101752 A1 * | 5/2005 | Matsumoto et al. | 526/319 |
| 2005/0122456 A1 | 6/2005 | Shuto et al. | |
| 2006/0193998 A1 * | 8/2006 | Harding et al. | 428/1.1 |
| 2008/0160222 A1 * | 7/2008 | Harding et al. | 428/1.26 |

FOREIGN PATENT DOCUMENTS

| | | |
|---|---|---|
| EP | 0524028 A1 | 1/1993 |
| EP | 0573278 A2 | 8/1993 |
| EP | 1405850 A1 * | 4/2004 |
| EP | 1850155 A1 * | 10/2007 |
| JP | H04-57017 A | 2/1992 |
| JP | H05-157911 A | 6/1993 |
| JP | H05-333313 A | 12/1993 |
| JP | 07-165751 B2 | 6/1995 |
| JP | 2853064 B2 | 11/1998 |
| JP | 3018120 B2 | 1/2000 |
| JP | 2000-155216 A | 6/2000 |
| JP | 2000-304924 A | 11/2000 |
| JP | 2002-040428 A | 2/2002 |
| JP | 2002-174725 A | 6/2002 |
| JP | 2002-333524 A | 11/2002 |
| JP | 2002-333642 A | 11/2002 |
| JP | 2003-002927 A | 1/2003 |
| JP | 2003-149441 * | 5/2003 |
| JP | 2003-149441 A | 5/2003 |
| JP | 2003-207782 A | 7/2003 |
| JP | 2004-123882 A | 4/2004 |
| JP | 2004-309904 A | 11/2004 |
| WO | WO 03042732 A1 * | 5/2003 |

* cited by examiner

Fig. 3

| 7. | Linear Polarizing Film |
|---|---|
| 10. | Homeotropic Alignment Liquid Crystal Film |
| 9. | First Optical Anisotropic Element |
| 8. | Third Optical Anisotropic Element |
| 2. | Substrate |
| 4. | Counter Electrode |
| 5. | Liquid Crystal Layer (Vertical Alignment) |
| 3. | Transparent Electrode |
| 1. | Substrate |
| 12. | Third Optical Anisotropic Element |
| 13. | First Optical Anisotropic Element |
| 14. | Homeotropic Alignment Liquid Crystal Film |
| 11. | Linear Polarizing Film |

6. Vertical Alignment Type Liquid Crystal Cell

Fig. 8

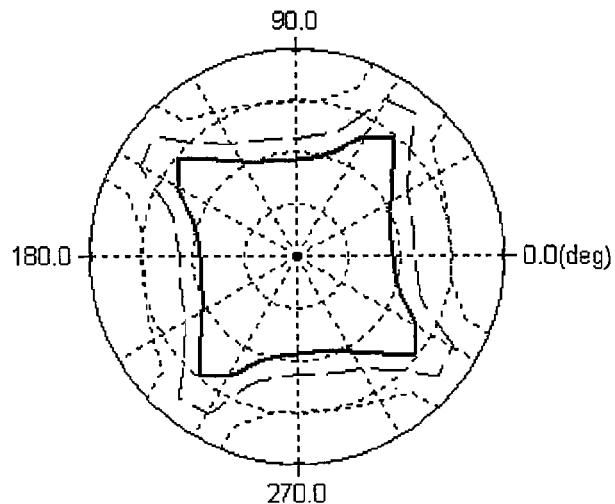

Fig. 9

| 7. Linear Polarizing Film |
| 10. Homeotropic Alignment Liquid Crystal Film |
| 17. Second Optical Anisotropic Element |
| 9. First Optical Anisotropic Element |
| 8. Third Optical Anisotropic Element |
| 2. Substrate |
| 4. Counter Electrode |
| 5. Liquid Crystal Layer (Vertical Alignment) |
| 3. Transparent Electrode / 15. Reflective Electrode |
| 1. Substrate |
| 12. Third Optical Anisotropic Element |
| 13. First Optical Anisotropic Element |
| 18. Second Optical Anisotropic Element |
| 14. Homeotropic Alignment Liquid Crystal Film |
| 11. Linear Polarizing Film |

16. Vertical Alignment Type Liquid Crystal Cell

HOMEOTROPIC ALIGNMENT LIQUID CRYSTAL FILM, OPTICAL FILM COMPRISING THE SAME, AND IMAGE DISPLAY DEVICE

CROSS-REFERENCE TO RELATED APPLICATIONS

This application is a continuation of International Application No. PCT/JP2006/301607, filed Jan. 25, 2006, which was published in the Japanese language on Aug. 17, 2006, under International Publication No. 2006/085454, the disclosure of which is incorporated herein by reference.

BACKGROUND OF THE INVENTION

The present invention relates to homeotropic alignment liquid crystal films. The homeotropic alignment liquid crystal films of the present invention alone or in combination with other optical films may be used as optical films such as retardation films, viewing angle compensators, elliptical polarizers, and brightness enhancement films. The present invention also relates to image display devices comprising such homeotropic alignment liquid crystal films, such as liquid crystal display devices, organic EL display devices, and PDPs.

Optical films with a refractive index anisotropy have taken industrially important roles as used for enhancing the image quality of a liquid crystal display device. The optical films with a refractive index anisotropy may be broadly classified into those produced by stretching plastic films and those produced by aligning liquid crystalline substances. The latter are more worthy of attention because they have potentials that they achieve structures with various refractive indices.

Films having a larger refractive index in the thickness direction are assumed to be effective in improving the viewing angle of a liquid crystal display device. It is assumed that the use of a homeotropic alignment (vertically aligned) liquid crystal is a close approach to obtain such films. The homeotropic alignment of liquid crystal molecules denotes that the longitudinal axes of liquid crystal molecules are aligned substantially vertically relative to the substrate. It is well known that the homeotropic alignment can be obtained by applying electric field to a pair of glass substrates sandwiching a liquid crystal as done in a liquid crystal display device. However, it is very difficult to form the aligned liquid crystal into a film, and the processes having been reported so far have possessed many problems.

For example, in the processes disclosed in the following Patent Documents 1 to 3, the film is obtained by allowing a main chain polymeric liquid crystalline compound to be homeotropically aligned and fixing the compound by vitrification. It is assumed that in the homeotropic alignment, the molecules of the polymeric compound are aligned in the thickness direction and thus there is a concern that cracking is likely to occur in the plane direction. However, in these processes, no technical measure of for example strengthening the materials by cross linking is taken. In the process disclosed in Patent Document 4, the homeotropic alignment of a side chain polymeric liquid crystalline compound is fixed by vitrification. However, there is a concern in terms of strength that is more serious than where a main chain polymeric liquid crystalline compound is used. In the processes disclosed in Patent Documents 5 and 6 below, a polymerizable low molecular weight liquid crystalline compound is added to a side chain polymeric liquid crystalline compound, but there is a limit in reinforcement thereof because the low molecular weight liquid crystalline compound is solely polymerized.

In the process disclosed in Patent Document 7 below, a material is used wherein a radically polymerizable group or a cationically polymerizable group such as vinyl ether and epoxy groups is introduced into a side chain polymeric liquid crystalline compound. However, in general, radical polymerization undergoes oxygen inhibition and may proceed insufficiently, leading the necessity of large facilities or apparatus for removal of oxygen. The vinyl ether or epoxy group is advantageous in this regard because it does not encounter oxygen inhibition. However, there is a concern that the ether bond of the vinyl ether group is unstable and tends to cleave. It is difficult to introduce the epoxy group into a liquid crystalline material and obtain a high polymerization degree when cross linking is carried out. Furthermore, since a large amount of non-liquid crystalline structural units is introduced into the liquid crystalline material in order to obtain the homeotropic alignment, there still remains a concern regarding the stable exhibition of liquid crystallinity. As described above, there have been remains problems in the conventional production of a homeotropic alignment liquid crystal film.

An image display device such as a liquid crystal display device varies in contrast associated with a change in viewing angle due to the birefringence of the liquid crystal or the like. For the purpose of preventing such contrast variations, a technique has been proposed wherein a retardation film is arranged on the liquid crystal cell of a liquid crystal device so as to compensate the optical characteristics relating to birefringence thereby improving the viewing angle characteristics. A uniaxial or biaxial stretched film is used as such a retardation film for compensation. However, such a stretched film does not necessarily have viewing angle characteristics satisfactory to all liquid crystal cells.

Patent Document 8 discloses a continuously carried-out process for producing a retardation film, characterized in that on one or both surfaces of an elongate thermoplastic resin film is bonded one or more heat-contractive films, and the elongate film is held with the grips of a tenter and contracted in the width direction at Magnification A which is in the range of 0.7 or more to less than 1.0, by allowing the contraction force of the heat-contraction films to be acted, followed by stretching and widening the elongate film at a stretch ratio (%) meeting the requirement that the percentage is equal to or less than that represented by $(100-\text{Magnification A}\times 100)\times 0.15$ where the film width excluding the parts held by the grips after the contraction is 100.

In this process, the film is also stretched in the thickness direction, resulting in a retardation film having a retardation in the thickness direction. However, when the main refractive indices in the resulting retardation film plane and the refractive index in the retardation film thickness direction are nx and ny, and nz, respectively and nx>ny, Nz defined by $Nz=(nx-nz)/(nx-ny)$ will be $-1.0<Nz<0.1$. Therefore, there is a limit in stretching in the thickness direction, and thus the retardation in the thickness direction can not be controlled in a wide range. Furthermore, since in this process, the elongate film is stretched in the thickness direction by heat contraction, the resulting retardation film will be thicker than the elongate film. That is, the retardation film produced by this process has a thickness of 50 to 100 µm, which is not thin enough to meet the low profiling required in a liquid crystal display device or the like.

In the process disclosed in Patent Document 9, a retardation film is produced which a homeotropic alignment liquid crystal film and a stretched film with a retardation function are integrally laminated. The process for producing the homeotropic alignment liquid crystal film is the same as that disclosed in Patent Document 7 and is insufficient because the conventional processes including this process still have problems.

In the vertical alignment mode, which is one of the display modes of a liquid crystal display device, the liquid crystal molecules are aligned vertically to the substrate when no electric voltage is applied thereto and produces a black image when linear polarizers are arranged in a crossing relation to each other on both sides of the liquid crystal cell.

The optical characteristics in the liquid crystal cell is isotropic in the plane direction, and thus an ideal viewing angle compensation therefor can be easily achieved. When an optical element with a negative uniaxial optical anisotropy in the thickness direction of the liquid crystal cell is inserted between one or both surfaces thereof and the linear polarizers in order to compensate the positive uniaxial optical anisotropy in the liquid crystal cell thickness direction, very excellent black image viewing angle characteristics can be obtained.

Upon application of an electric voltage, the liquid crystal molecules changes their alignment from the vertical direction relative to the substrate surface toward the parallel direction. Thereupon, it is difficult to make the liquid crystal alignment uniform. The use of a usual alignment treatment, i.e., a rubbing treatment on the substrate results in a significant deterioration in display quality.

There are proposals for making the liquid crystal alignment uniform upon application of an electric voltage that a uniform alignment is obtained by modifying the shape of the electrodes on the substrates so that an oblique electric field is generated in the liquid crystal layer. Although this method enables the liquid crystal alignment to be uniform, an uneven alignment region is produced when viewed at the micro level and will be a dark region upon application of an electric voltage. Therefore, the transmissivity of the liquid crystal display device will be diminished.

Patent Document 11 proposes a configuration wherein the linear polarizers arranged on the both surfaces of a liquid crystal cell having a liquid crystal layer which may be in a random alignment are replaced by circular polarizers. Replacement of the linear polarizers by circular polarizers each of which is a combination of a linear polarizer and a ¼ wavelength plate can eliminate the dark region produced upon application of an electric voltage and accomplish to produce a liquid crystal display device with high transmissivity. However, the vertical alignment type liquid crystal display device with the circular polarizers has a problem that it has narrower viewing angle characteristics than that with the linear polarizers.

Patent Document 12 proposes an optical anisotropic element with a negative uniaxial optical anisotropy or a biaxial optical anisotropic material for compensating the viewing angle of a vertical alignment type liquid crystal display device with circular polarizers. However, although the optical anisotropic element with a negative uniaxial optical anisotropy can compensate the positive uniaxial optical anisotropy in the cell thickness direction, it fails to compensate the viewing angel characteristics of the ¼ wavelength plate, resulting in insufficient viewing angle characteristics.

Patent Document 1: Japanese Patent Publication No. 2853064

Patent Document 2: Japanese Patent Publication No. 3018120

Patent Document 3: Japanese Patent Publication No. 3078948

Patent Document 4: Japanese Patent Laid-Open Publication No. 2002-174725

Patent Document 5: Japanese Patent Laid-Open Publication No. 2002-333524

Patent Document 6: Japanese Patent Laid-Open Publication No. 2002-333642

Patent Document 7: Japanese Patent Laid-Open Publication No. 2003-2927

Patent Document 8: Japanese Patent Laid-Open Publication No. 2002-304924

Patent Document 9: Japanese Patent Laid-Open Publication No. 2003-149441

Patent Document 10: Japanese Patent Laid-Open Publication No. 2003-2927

Patent Document 11: Japanese Patent Laid-Open Publication No. 2002-40428

Patent Document 12: Japanese Patent Laid-Open Publication No. 2003-207782

BRIEF SUMMARY OF THE INVENTION

The present invention provides a homeotropic alignment liquid crystal film which can be produced stably without the necessity of complicated steps such as photo-irradiation under an inert gas atmosphere and is excellent in alignment retainability after being fixed in a homeotropic alignment and in mechanical strength; a laminated retardation film which can control the retardation in the thickness direction in a wide range; and a viewing angle compensator with excellent viewing angle characteristics as well as image display devices such as liquid crystal display devices, comprising an optical film such as a brightness enhancement film comprising the homeotropic alignment liquid crystal film.

The present invention was accomplished as the results of extensive studies carried out to solve the above-described problems.

That is, the present invention relates to a homeotropic liquid crystal film comprising a liquid crystalline substance containing a side chain liquid crystalline compound having an oxetanyl group, as a constituent, aligned homeotropically on an alignment substrate while the substance is in a liquid crystal state and fixed in the homeotropic alignment by allowing the oxetanyl group to react.

Alternatively, the present invention also relates to a homeotropic liquid crystal film comprising a liquid crystalline substance containing a side chain liquid crystalline compound having an oxetanyl group, as a constituent, aligned homeotropically on an alignment substrate while the substance is in a liquid crystal state and fixed in the homeotropic alignment by allowing the oxetanyl group to react, and satisfying the following requirements:

$$0 \text{ nm} \leq Re \leq 200 \text{ nm} \quad [1]$$

$$-500 \text{ nm} \leq Rth \leq -30 \text{ nm} \quad [2]$$

wherein Re indicates the retardation value in the liquid crystal film plane, Rth indicates the retardation value in the liquid crystal film thickness direction, and Re and Rth are defined by $Re = (Nx - Ny) \times d$ and $Rth = (Nx - Nz) \times d$, respectively, wherein d is the liquid crystal film thickness [nm], Nx and Ny are the main refractive indices in the liquid crystal film plane, Nz is the main refractive index in the thickness direction, and $Nz > Nx \geq Ny$.

The present invention also relates to an optical film comprising the homeotropic liquid crystal film and to an image display device comprising the optical film.

Furthermore, the present invention also relates to a laminated retardation film comprising a liquid crystal layer comprising a liquid crystalline substance containing a side chain liquid crystalline compound having an oxetanyl group, as a constituent, aligned homeotropically on an alignment substrate while the substance is in a liquid crystal state and fixed in the homeotropic alignment by allowing the oxetanyl group to react, and a stretched film with a retardation function integrally laminated with on the liquid crystal layer, and a process for producing such a laminated retardation film.

The present invention also relates to a viewing angle compensator for a vertical alignment type liquid crystal display device, comprising a liquid crystal film comprising a liquid crystalline substance containing a side chain liquid crystalline compound having an oxetanyl group, as a constituent, aligned homeotropically on an alignment substrate while the substance is in a liquid crystal state and fixed in the homeotropic alignment by allowing the oxetanyl group to react.

The present invention also relates to a vertical alignment type liquid crystal display device comprising the viewing angle compensator therefor.

The present invention will be described in more detail below.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 3 is a schematic cross-sectional view of the vertical alignment type liquid crystal display of Example 8;

FIG. 8 is a view indicating the contrast ratio when viewing the vertical alignment type liquid crystal display of Example 9 from all the directions;

FIG. 9 is a schematic cross-sectional view of the transflective vertical alignment type liquid crystal display of Example 10;

DETAILED DESCRIPTION OF THE INVENTION

Figure 1:
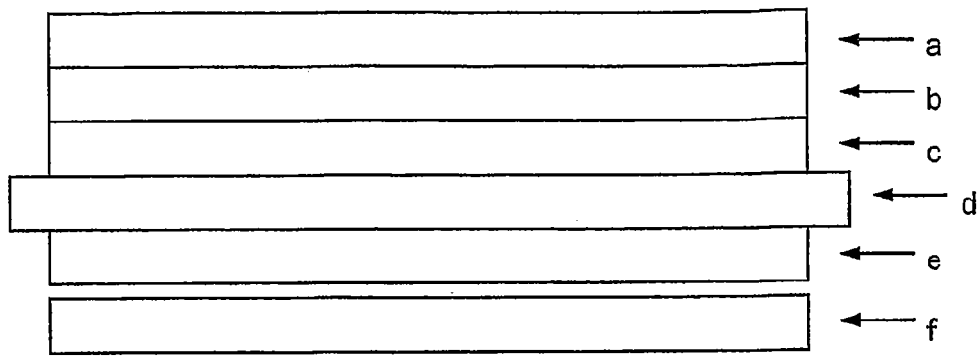
FIG. 1 is a conceptual view for illustrating the liquid crystal display devices used in Examples 2, 5 and 6.

Selections of liquid crystal materials and alignment substrates are extremely important upon production of the liquid crystal film fixed in a homeotropic alignment according to the present invention.

First of all, the liquid crystal materials will be described.

Liquid crystal materials which may be used in the present invention are those (liquid crystalline substances) containing at least a side chain liquid crystalline polymeric compound having an oxetanyl group, as a constituent. Specific examples of such materials include those containing mainly a side chain liquid crystalline polymer such as poly(meth)acrylates and polysiloxanes, having at one of its terminal ends a polymerizable oxetanyl group. More specifically, preferred examples include side chain liquid crystalline polymeric compounds produced by homopolymerizing or copolymerizing the (meth)acrylic portion of a (meth)acrylic compound having an oxetanyl group represented by formula (1) below with another (meth)acrylic compound:

$$R_1-\underset{\underset{O}{\|}}{C}(=CH_2)-C-O-(CH_2)_n-L_1-M-L_2-(CH_2)_m-O-\text{[oxetane-}R_2\text{]} \tag{1}$$

wherein $R_1$ is hydrogen or methyl, $R_2$ is hydrogen, methyl, or ethyl, $L_1$ and $L_2$ are each a single bond, —O—, —O—CO— or —CO—O—, M is represented by any of formulas (2) to (4) below, and m and n are each an integer of 0 to 10:

$$-P_1\text{-}L_3\text{-}P_2\text{-}L_4\text{-}P_3- \tag{2}$$

$$-P_1\text{-}L_3\text{-}P_3- \tag{3}$$

$$-P_3- \tag{4}$$

wherein $P_1$ and $P_2$ are each a group represented by formula (5) below, $P_3$ is a group represented by formula (6) below, and $L_3$ and $L_4$ are each a single bond, —CH=CH—, —C≡C—, —O—, —O—CO—, or —CO—O—:

(5)

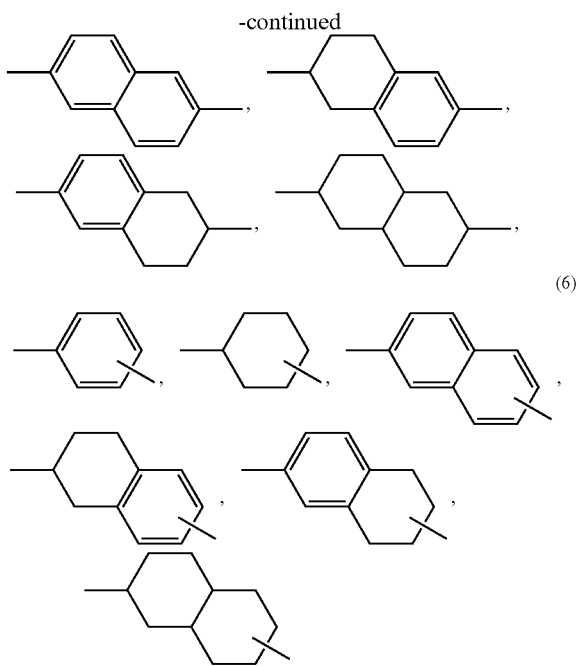

(6)

There is no particular restriction on the method of synthesizing the (meth)acrylic compound having an oxetanyl group represented by formula (1). Therefore, there may be used any conventional method utilized in the field of organic chemistry. For example, a portion having an oxetanyl group is coupled to a portion having a (meth)acrylic group by means of the Williamson's ether synthesis or an ester synthesis using a condensing agent thereby synthesizing a (meth)acrylic compound having two reactive functional groups, i.e., an oxetanyl group and a (meth)acrylic group.

A side chain polymeric liquid crystalline compound containing a unit represented by formula (7) below is produced by homopolymerizing the (meth)acrylic group of a (meth)acrylic compound having an oxetanyl group represented by formula (1) or copolymerizing the same with another (meth)acrylic compound:

(7)

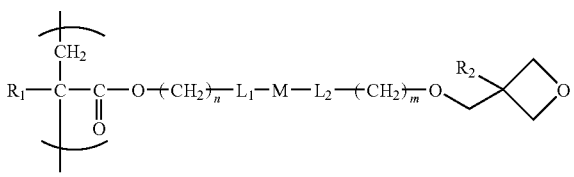

There is no particular restriction on the polymerization conditions which, therefore, may be those for ordinary radical or anion polymerization.

As an example of the radical polymerization, a method may be used in which a (meth)acrylic compound is dissolved in a solvent such as dimethylformamide (DMF) and reacted at a temperature of 60 to 120° C. for several hours using 2,2'-azobisisobutylonitrile (AIBN) or benzoyl peroxide (BPO) as an initiator. Alternatively, in order to allow the liquid crystal phase to be stably exhibited there is an effective method in which living radical polymerization is conducted using an initiator such as a copper (II) bromide/2,2'-bipyridyl-based initiator or a 2,2,6,6-tetramethylpiperidinyloxy free radical (TEMPO)-based initiator so as to control the molecular weight distribution. These radical polymerizations are needed to be conducted strictly under deoxidation conditions.

As an example of the anionic polymerization, a method may be used in which a (meth)acrylic compound is dissolved in a solvent such as tetrahydrofuran (THF) and reacted using a strong base such as organic lithium compounds, organic sodium compounds or the Grignard reagent as an initiator. Alternatively, this polymerization can be converted to living anionic polymerization by optimizing the initiator or reaction temperature thereby controlling the molecular weight distribution. These anionic polymerizations are needed to be conducted strictly under dehydration and deoxidation conditions.

There is no particular restriction on types of a (meth)acrylic compound added to be copolymerized as long as the resulting polymeric substance exhibits liquid crystallinity. However, preferred are (meth)acrylic compounds having a mesogen group because they can enhance the liquid crystallinity of the resulting polymeric substance. More specifically, particularly preferred are those as represented by the following formulas:

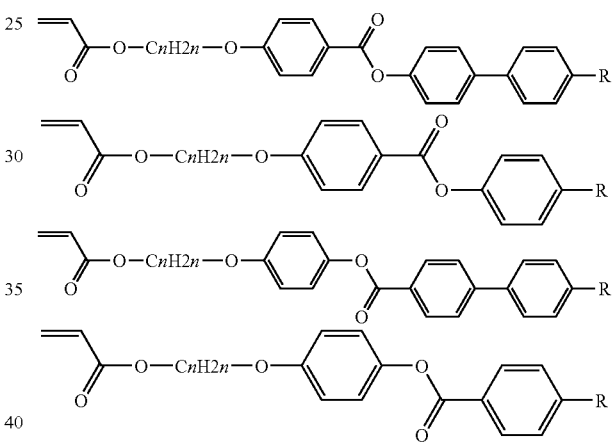

In the above formulas, R is hydrogen, an alkyl group having 1 to 12 carbon atoms, an alkoxy group having 1 to 12 carbon atoms, or a cyano group.

The side chain liquid crystalline polymeric compound used as the liquid crystal material in the present invention contains a unit of formula (7) in an amount of preferably 5 to 100 percent by mole, particularly preferably 10 to 100 percent by mole. The side chain liquid crystalline polymeric compound has a weight average molecular weight of preferably 2,000 to 100,000, particularly preferably 5,000 to 50,000.

Other than the above-described side chain liquid crystalline polymeric compounds, the liquid crystal material used in the present invention may contain various compounds which may be mixed therewith out impairing the liquid crystallinity. Examples of such compounds include those having a cationic polymerizable functional group such as oxetanyl, epoxy, and vinylether groups; various polymeric compounds having a film forming capability; and various low molecular- or polymeric-liquid crystalline compounds exhibiting liquid crystallinity. When the side chain liquid crystalline polymeric compound is used in the form of a composition, the percentage of the compound in the whole composition is preferably 10 percent by mass or more, preferably 30 percent by mass or more, more preferably 50 percent by mass or more. When the side chain liquid crystalline polymeric compound is contained in an amount of less than 10 percent by mass, the concentration of the polymerizable group in the composition will be low, resulting in insufficient mechanical strength after polymerization.

In the present invention, the liquid crystal material is homeotropically aligned and fixed in the homeotropic alignment by polymerizing cationically the oxetanyl group to be cross-linked.

Therefore, the liquid crystal material preferably contains a photo- or thermal-cation generator which generates cations with an external stimulus such as light or heat. If necessary, various sensitizers may be used in combination.

The term "photo cation generator" used herein denotes a compound which can generate cations by irradiating a light with a specific wavelength and may be any of organic sulfonium salt-, iodonium salt-, or phosphonium salt-based compounds. Counter ions of these compounds are preferably antimonate, phosphate, and borate. Specific examples include $Ar_3S^+SbF_6^-$, $Ar_3P^+BF_4^-$, and $Ar_2I^+PF_6^-$ wherein Ar indicates a phenyl or substituted phenyl group. Sulfonic acid esters, triazines, diazomethanes, β-ketosulfones, iminosulfonates, and benzoinsulfonates may also be used.

The term "thermal cation generator" used herein denotes a compound which can generate cations by being heated to a certain temperature and may be any of benzylsulfonium salts, benzylammonium salts, benzylpyridinium salts, benzylphosphonium salts, hydrazinium salts, carbonic acid esters, sulfonic acid esters, amineimides, antimony pentachloride-acetyl chloride complexes, diaryliodonium salt-dibenzyloxy coppers, and halogenated boron-tertiary amine adducts.

Since the amount of the cation generator to be added in the polymerizable liquid crystalline composition varies depending on the structures of the mesogen portion or spacer portions constituting the side chain liquid crystalline polymer to be used, the equivalent weight of the oxetanyl group, and the conditions for aligning the composition in a liquid crystal state, it can not be determined with certainty. However, it is within the range of usually 100 ppm by mass to 20 percent by mass, preferably 1,000 ppm by mass to 10 percent by mass, more preferably 0.2 percent by mass to 7 percent by mass, and most preferably 0.5 percent by mass to 5 percent by mass. An amount of the cation generator of less than 100 ppm by mass is not preferable because polymerization may not progress due to the insufficient amount of cation to be generated. An amount of the cation generator of more than 20 percent by mass is not also preferable because a large amount of the undecomposed residue of the cation generator remains in the resulting liquid crystal film and thus the light resistance thereof would be degraded.

The alignment substrate will be described next.

The alignment substrate which may be used in the present invention is preferably a substrate with a flat and smooth surface. Examples of such a substrate include films or sheet formed of organic polymeric materials, glass sheets, and metals. It is preferred to use materials such as organic polymeric materials, in view of cost and continuous productivity. Examples of the organic polymeric materials include polyvinyl alcohols, polyimides, polyphenylene sulfides, polyphenylene oxides, polyetherketones, polyetheretherketones, polyether sulfones, polyethylene naphthalates, polyethylene terephthalates, polyarylates, and triacetyl cellulose. The organic polymeric materials may be used alone as an alignment substrate or in the form of film formed on another substrate.

In order to obtain the homeotropic alignment stably using the above-described liquid crystal material, the material forming an alignment substrate preferably has a long chain (usually 4 or more, preferably 8 or more carbon atoms and there is no particular restriction on the upper limit, but usually 50 or fewer, preferably 40 or fewer) hydrocarbon group (in particular, alkyl or alkenyl group). Amongst, most preferred are polyvinyl alcohols (PVA) having a long chain hydrocarbon.

Examples of the long chain hydrocarbon include alkyl groups such as butyl, pentyl, hexyl, heptyl, octyl, nonyl, decyl, undecyl, dodecyl, tridecyl, tetradecyl, pentadecyl, hexadecyl, heptadecyl, octadecyl, and eicosane groups, oleyl, and eicosenyl groups.

There is no particular restriction on PVA. However, in view of polymerization degree, preferred are those with a polymerization degree of 100 or greater and 3000 or less, and more preferred are those with a polymerization degree of 200 or greater and 2000 or less. In view of saponification degree, preferred are those with a saponification degree of 60% or higher, and more preferred are those with a saponification degree of 80% or higher. A PVA with a polymerization degree of less than 100 would be insufficient in strength as an alignment film while a PVA with a polymerization degree of greater than 3000 would make it difficult to prepare a solution for coating and to use the solution. A PVA with a saponification degree of less than 60% would be insufficient in heat resistance as an alignment film and fail to perform its function sufficiently because the alignment film would be corroded with a solution of the liquid crystal material when the solution is coated on the alignment film.

In the field of the liquid crystal, a substrate is generally rubbed with cloth for aligning a liquid crystal material, so-called rubbing treatment. However, the homeotropic alignment of the present invention is an alignment structure wherein anisotropy in the film plane does not substantially occurs and thus does not always need a rubbing treatment. However, with the objective of suppressing the liquid crystal from being repelled when it is coated on an alignment film, a weak rubbing treatment is preferably carried out. An important set value for regulating the rubbing conditions is the peripheral velocity ratio. The peripheral velocity ratio denotes a ratio of the moving velocity of the rubbing cloth to the moving velocity of the substrate when a rubbing cloth wrapped around a roll is rolled and rubs over a substrate. The weak rubbing treatment denotes a rubbing treatment carried out by rotating the rubbing cloth at a peripheral velocity ratio of usually 1.5 or greater and 50 or less, preferably 2 or greater and 25 or less, and particularly preferably 3 or greater and 10 or less. A peripheral velocity ratio of less than 1.5 would cause deficient peeling or releasing when a peel off step described below is carried out. A peripheral velocity ratio of greater than 50 would be too strong rubbing effect which fails to align the liquid crystal material in a complete vertical position, which material is tilted toward the plane direction rather than the vertical direction. A so-called fixed rubbing treatment wherein only the substrate is conveyed over the rubbing roll which is not rotated but is fixed may be used as a weak rubbing treatment.

The method of producing the liquid crystal film of the present invention will be described next.

Although not restricted, the liquid crystal film may be produced by spreading the above-described liquid crystal material over the above-described alignment substrate so as to be aligned and fixed in an aligned state by photo-irradiation or heat treatment.

The method of forming a liquid crystal material layer by spreading the liquid crystal material over the alignment substrate may be a method wherein the liquid crystal material in a molten state is directly coated over the alignment substrate or a method wherein a solution of the liquid crystal material is coated over the alignment substrate and dried to evaporate the solvent.

There is no particular restriction on the solvent used for preparing the solution as long as it can dissolve the liquid crystal material and be evaporated under appropriate conditions. Preferred examples of the solvent include ketones such as acetone, methyl ethyl ketone, isophorone, and cyclohexanone; ether alcohols such as butoxy ethyl alcohol, hexyloxy ethyl alcohol, and methoxy-2-propanol; glycol ethers such as ethylene glycol dimethylether and diethylene glycol dimethyl ether; esters such as ethyl acetate and ethyl lactate; phenols such as phenol and chlorophenol; amides such as N,N-dimethylformamide, N,N-dimethylacetoamide, and N-methylpyrrolidone; halogens such as chloroform, tetrachloroethane, and dichlorobenzene; and mixtures thereof. Surfactants, defoaming agents, or leveling agents may be added to the solution so as to form a uniform film layer on an alignment substrate.

Regardless of whether the liquid crystal material is coated directly or in the form of a solution, there is no particular restriction on the method of coating the liquid crystal material as long as the uniformity of the film layer can be maintained. For example, there may be used spin coating, die coating, curtain coating, dip coating, and roll coating methods.

The coating of a solution of the liquid crystal material is preferably followed by a drying step for removal of the solvent after coating. There is no particular restriction on the drying step as long as it can maintain the uniformity of the coated film, which may be any conventional method. For example, there may be used a method using a heater (furnace) or a hot air blowing.

The liquid crystal material layer formed on the alignment substrate is homeotropically aligned by a heat treatment or the like and then cured by photo-irradiation and/or a heat treatment so as to be fixed in the homeotropic alignment. The first heat treatment (carried out for forming the liquid crystal) aligns the liquid crystal material homeotropically by heating the material at a temperature in such a range that the liquid crystal material exhibits a liquid crystal phase, synergistically with the action of the above-described alignment substrate.

Since the conditions for the heat treatment vary in optimum conditions and limits depending on the liquid crystal phase behavior temperature (transition temperature) of the liquid crystal material to be used, it can not be determined with certainty. However, the heat treatment is conducted at a temperature within the range of usually 10 to 250° C., preferably 30 to 160° C., more preferably at a temperature higher than the Tg of the liquid crystal material, more preferably at a temperature higher by 10° C. or higher than the Tg of the liquid crystal material. A too low temperature is not preferable because there is a possibility that the liquid crystal material may not be aligned sufficiently, while a too high temperature is not also preferable because the alignability of an alignment film substrate may be adversely affected. The heat treatment is conducted for usually 3 seconds to 30 minutes and preferably 10 seconds to 10 minutes. A heat treatment for shorter than 3 seconds is not preferable because there is a possibility that the liquid crystal material may not be aligned in a liquid crystal phase completely. Whereas, a heat treatment for longer than 30 minutes is not also preferable because the productivity is diminished.

As described above, after the liquid crystal material is aligned homeotropically by a heating treatment, it is cured (cross-linked) by polymerizing the oxetanyl group therein while being retained in the homeotropic aligned state. The liquid crystal material is fixed in the homeotropic aligned state by the curing (cross-linking) reaction and then modified into a stronger film.

As described above, since the liquid crystal material used in the present invention has a polymerizable oxetanyl group, it is preferred to use a cationic polymerization initiator (cation generator) for polymerizing (cross-linking) the reactive group. As such a cation generator, a photo-cation generator is preferred to a thermal-cation generator.

In the case of using a photo-cation generator, after addition thereof, the processes up to the heating treatment for aligning the liquid crystal material are conducted under such dark conditions (conditions where light is shielded to an extent that the photo-cation generator does not dissociate) that the liquid crystal material does not cure until subjected to the aligning process and thus can be aligned homeotropically while maintaining sufficient flowability. Thereafter, a light from a light source capable of emitting an appropriate wavelength of light is irradiated so as to allow the photo-cation generator to generate cations thereby curing the liquid crystal material while maintaining the homeotropic alignment.

The light irradiation is conducted by irradiating a light from a light source having a spectrum in an absorption wavelength region of the photo-cation generator to be used, such as a metal halide lamp, a high-pressure mercury lamp, a low-pressure mercury lamp, a xenon lamp, an arc discharge lamp, and a laser thereby decomposing the photo-cation generator. The irradiation dose per $cm^2$ is within the range of generally 1 to 2,000 mJ and preferably 10 to 1,000 mJ in the integrated irradiation dose. However, when the absorption region of the photo-cation generator is extremely different from the spectrum of the light source, or the liquid crystal material itself can absorb a light in the wavelength of the light source, the irradiation dose is not limited to the above range. In these cases, a method may be employed in which a suitable photo sensitizer or two or more types of photo-cation generators having different absorption wavelengths may be used.

The temperature upon light irradiation needs to be within such a range that the liquid crystal material is aligned in a liquid crystal phase. Furthermore, the light irradiation is preferably conducted at a temperature which is equal to or higher than the Tg of the liquid crystal material, in order to enhance the efficiency of the curing sufficiently.

The liquid crystal layer produced through the above-described processes becomes a sufficiently solid and strong film. More specifically, since the three-dimensional bond of the mesogen portion is achieved by the curing reaction, the liquid crystal layer is significantly improved not only in heat-resistance (the upper limit temperature at which the liquid crystal phase is maintained) but also in mechanical strength such as resistance to scratch, wear, and cracking compared with that before being cured.

In the case where there arise problems that the alignment substrate to be used is not optically isotropic, the resulting liquid crystal film is opaque at a wavelength region where it is intended to be used, or the alignment substrate is so thick that it causes a problem in practical use, the liquid crystal layer may be transferred to an optically isotropic substrate film or a substrate film which is transparent at a wavelength region where the liquid crystal film is intended to be used or to a substrate film temporarily until the liquid crystal film is attached to a liquid crystal cell.

The transferring method may be any conventional method. For example, as disclosed in Japanese Patent Laid-Open Publication Nos. 4-57017 and 5-333313, a method may be used in which after a substrate film different from the alignment substrate, for transferring is laminated via a tacky adhesive or adhesive over a liquid crystal layer on the alignment substrate and if necessary a tacky adhesive or adhesive is coated over the other surface, on which the liquid crystal film layer is not laminated, of the substrate film for transferring and then cured, only the liquid crystal film is transferred on the substrate film for transferring by releasing the alignment substrate. Examples of the transparent substrate onto which the liquid crystal layer is transferred include triacetyl cellulose films such as Fujitac (manufactured by Fuji Photo Film Co., Ltd.) and Konicatac (manufactured by Konica Corp.); TPX film (manufactured by Mitsui Chemical Inc.); transparent films such as Arton film (manufactured by JSR), Zeonex film (manufactured by Zeon Corp.), and Acryplene film (manufactured by Mitsubishi Rayon Co., Ltd.); and a polyethylene terephthalate film treated with silicone or provided on its surface with a releasable layer. If necessary, the liquid crystal film may be directly transferred to a polarizing film.

There is no particular restriction on the tacky adhesive or adhesive to be used for transferring the liquid crystal film as long as it is of optical grade. Therefore, there may be used conventional acrylic-, epoxy-, or urethane-based adhesives.

When the thickness is d [nm], the main refractive indices in the film plane are Nx and Ny, the main refractive index in the film thickness direction is Nz, and Nx≧Ny in the homeotropic alignment liquid crystal film, preferably the retardation value in the film plane (Re=(Nx−Ny)×d) is from 0 to 200 nm, and the retardation value in the film thickness direction (Rth=(Nx−Nz)×d) is from −500 to −30 nm.

The Re and Rth values which are optical parameters of the homeotropic alignment liquid crystal film can not be determined with certainty because they depend on whether the liquid crystal film is used as a brightness enhancement film or a viewing angle improvement film for a liquid crystal display device or depend on the mode thereof or various optical parameters when the liquid crystal film is used as a viewing angle improvement film. However, the retardation value in the homeotropic alignment film plane (Re) is adjusted within the range of usually from 0 nm to 200 nm, preferably from 0 nm to 100 nm, more preferably from 0 nm to 50 nm with respect to a monochromic light of 550 nm while the retardation value in the thickness direction (Rth) is adjusted within the range of usually from −500 nm to −30 nm, preferably from −400 nm to −50 nm, more preferably from −400 nm to −100 nm with respect to a monochromic light of 550 nm.

Adjustment of the Re and Rth values within the above ranges makes it possible that when the liquid crystal film is used an viewing angle improvement film for a liquid crystal display device, the viewing angle thereof can be widened, compensating the color tone and that when the liquid crystal film is used as a brightness enhancement film, an excellent brightness enhancement effect can be expected. An Re value of larger than 200 nm would degrade the front characteristics of the liquid crystal display device due to the affect of the large front retardation value. An Rth of larger than −30 nm or smaller than −500 nm would fail to obtain sufficient viewing angle improving effect or cause unnecessary coloration when the liquid crystal display device is viewed obliquely.

The thickness of the liquid crystal film can not be determined with certainty because it depends on the mode of a liquid crystal display device or various optical parameters but is usually from 0.2 μm to 10 μm, preferably from 0.3 μm to 5 μm, more preferably from 0.5 μm to 2 μm. A film thickness of less than 0.2 μm would fail to obtain sufficient viewing angle improving effect or brightness enhancing effect. A film thickness of greater than 10 μm cause unnecessary coloration on the liquid crystal display device.

The homeotropic alignment liquid crystal film produced as described above can be quantified by measuring the optical retardation at an angle wherein the liquid crystal film is tilted from a vertical incidence. The optical retardation value of the homeotropic alignment liquid crystal film is in contrast with respect to the vertical incidence. There may be used various methods for the optical retardation measurement. For example, an automated birefringence measuring device (manufactured by Oji Scientific Instruments) and a polarization microscope may be used. The homeotropic alignment liquid crystal film looks black between crossed nicols polarizers. In this manner, the homeotropic alignability was evaluated.

The homeotropic alignment liquid crystal film of the present invention may be laminated with one or more other optical films so as to form an optical film.

For example, the homeotropic alignment liquid crystal film may be arranged between a cholesteric liquid crystal film and a ¼ wavelength plate so as to form a brightness enhancement film. The cholesteric liquid crystal film and ¼ wavelength plate may be any of those conventionally used in a brightness enhancement film without any limitation.

Examples of the cholesteric liquid crystal film include those exhibiting characteristics that they reflect either one of right-handed or left-handed circularly polarized light and transmit the other, such as aligned films of cholesteric liquid crystalline polymers and such films supported on a film substrate. The cholesteric liquid crystal film may be any of those exhibiting circular dichroism in a part of spectrum of visible light or exhibiting circular dichroism in a spectrum of 200 nm or more in a visible light. The cholesteric liquid crystal film may be formed from a cholesteric liquid crystal polymer containing an optically active group-containing monomer as a monomer unit. Since the pitch of the cholesteric liquid crystal varies on the basis of the content of the optically active group-containing monomer, the circular dichroism can be controlled with the content of the monomer unit. The thickness of the cholesteric liquid crystal film is preferably usually from 1 to 30 μm, particularly preferably from 2 to 15 μm. The cholesteric liquid crystal film may be blended with one or more additives such as a polymer other than the above-described polymers or a stabilizer, an inorganic compound such as plasticizer, an organic compound, metal, a compound thereof if necessary.

The cholesteric liquid crystal film may be of an overlaid structure of two or more layers with different reflection wavelength in combination so that it can reflect a circularly polarized light in a wide wavelength range such as a visible light region thereby producing a transmissive circularly polarized light in a wide wavelength range.

In a brightness enhancement film which is a type of transmitting a circularly polarized light, such as the cholesteric liquid crystal film, it may allow the circularly polarized light to be made incident directly to a polarizer. However, preferably the circularly polarized light is converted to a linearly polarized light through a retardation film and then is made incident to the polarizer with the objective of suppressing the absorption loss. The use of a ¼ wavelength plate as the retardation film can convert a circularly polarized light to a linearly polarized light.

The ¼ wavelength plate may be any of those selected depending on the purposes of use. Optical characteristics such as retardation can be controlled by laminating two or more ¼ wavelength plates. Examples of the retardation film include birefringence films obtained by stretching films formed from appropriate polymers such as polycarbonates, norbornene resins, polyvinyl alcohols, polystyrenes, polymethyl methacrylates, polypropylenes, other polyolefins, polyarylates, and polyamides; aligned films formed from liquid crystal materials such as liquid crystal polymers; and aligned layers of liquid crystal materials supported on a film. The thickness of the ¼ wavelength plate is preferably from 0.5 to 200 µm, particularly preferably from 1 to 100 µm.

The retardation film functioning as a ¼ wavelength plate in a wide wavelength region such as a visible light region may be obtained by a method wherein for example, a retardation layer functioning as a ¼ wavelength plate with respect to a pale color light of a wavelength of 550 nm is overlaid on a retardation layer exhibiting other retardation characteristics, such as a retardation layer functioning as a ½ wavelength plate. Therefore, the retardation film arranged between the polarizer and the brightness enhancement film may be composed of one or more retardation layers.

The brightness enhancement film may be produced by forming the homeotropic alignment liquid crystal film on the ¼ wavelength plate used as a substrate and laminating the cholesteric liquid crystal film via a tacky adhesive layer on the homeotropic alignment liquid crystal film. Alternatively, the brightness enhancement film may be produced by transferring the homeotropic alignment liquid crystal film formed on a substrate to either one of the cholesteric liquid crystal film or the ¼ wavelength plate via a tacky adhesive layer and laminating the other thereon via a tacky adhesive layer.

There is no particular restriction on the tacky adhesive forming the tacky adhesive layer. There may be used any tacky adhesive appropriately selected from those containing a polymer such as an acrylic polymer, a silicone-based polymer, a polyester, a polyurethane, a polyamide, a polyether, a fluorine- or rubber-based polymer as a base polymer. In particular, it is preferred to use a tacky adhesive such as an acrylic tacky adhesive which is excellent in optical transparency and in weather resistance and heat resistance and exhibits tackiness characteristics such as moderate wetness, cohesivity and adhesivity.

The formation of the tacky adhesive layer may be carried out by any suitable method. As an example, there is a method wherein a base polymer or a composition thereof is dissolved or dispersed in a solvent containing toluene or ethyl acetate alone or in combination thereby preparing a tacky adhesive solution containing 10 to 40 percent by mass of the adhesive, which solution is then directly laid over the above-described substrate or liquid crystal film by an appropriate developing method such as casting or coating or alternatively wherein a tacky adhesive layer is formed in accordance with the method as described above on a separator and then transferred onto the liquid crystal layer. The tacky adhesive layer may contain additives such as natural or synthetic resins, in particular fillers or pigments containing tackiness-imparting resins, glass fibers, glass beads, metal powders, and other inorganic powders, dyes, anti-oxidants. The tacky adhesive layer may contain fine particles so as to exhibit light diffusivity.

When the homeotropic alignment liquid crystal film formed on a substrate is transferred via a tacky adhesive layer, the homeotropic alignment liquid crystal film may be subjected to a surface treatment. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

A polarizing film is used as an optical film applied to an image display device such as a liquid crystal display device. The homeotropic alignment liquid crystal film or brightness enhancement film of the present invention is used in the form of a laminate with an optical film such as a polarizing film.

A polarizing film wherein a polarizing film and the brightness enhancement film are laminated is arranged on the rear side of the liquid crystal cell for actual use. The brightness enhancement film exhibits characteristics that it reflects a linearly polarized light with a certain polarization axis or a circularly polarized light in a certain direction, upon incidence of light from the backlight of the liquid crystal display device or natural light reflected at the rear side of the liquid crystal cell and transmits the other light. The polarizing film wherein a polarizing film and the brightness enhancement film are laminated produces a transmitted light in a certain polarization state by making an incident of light from the light source such as a backlight and does not transmit but reflects the light other than the light in the certain polarization state. The light reflected on the brightness enhancement film surface is reversed by a reflection layer arranged on the rear side of the enhancement film so as to be made incident thereto again, and the whole or a part of the incident light is allowed to transmit in the form of the light in the certain polarized state thereby increasing the amount of the light transmitting through the brightness enhancement film and enhancing the brightness by increasing the amount of the light by supplying the polarized light which is hard to be absorbed by the polarizer, to be used for liquid crystal image display.

That is, when a light is made incident from the rear side of the liquid crystal cell with the backlight, through the polarizer, without using the brightness enhancement film, most of the light having the polarization direction which does not correspond to the polarization axis of the polarizer is absorbed thereby and does not transmit through the polarizer. That is, about 50 percent of the light is absorbed by the polarizer though depending on the characteristics of the polarizer, and thus the amount of the light which can be used for liquid crystal image displaying is decreased by the amount, resulting in dark images. The brightness enhancement film repeatedly reflects the light in the polarization direction which can be absorbed by the polarizer, not allowing the light to be made incident thereto and further reverses the light by a reflection layer arranged on its rear side so as to be made incident to the brightness enhancement film again. The brightness enhancement film transmits and supplies only the polarized light reflected and reversed between the film and the reflection film, the polarization direction of which polarized light is changed so as to be allowed to transmit through the polarizer. As the result, the brightness enhancement film can use the light from the backlight efficiently for the image display of a liquid crystal display device and thus can brighten the viewing surface thereof.

The polarizing film has usually a protective film on one or both surface of a polarizer. There is no particular restriction on the polarizer. There may be used various polarizers. Examples of the polarizer include those obtained by stretching uniaxially a hydrophilic polymer film such as a polyvinyl alcohol-based film, a partially formalized polyvinyl alcohol-based film or an ethylene-vinyl acetate copolymer-based partially saponified film to which a dichroic substance such as iodine or a dichroic dye is allowed to absorb; and polyene-based alignment films such as dehydrated products of PVA and dehydrochlorinated products of polyvinyl chloride. Among these polarizers, it is suitable to use those obtained by stretching and aligning a polyvinyl alcohol-based film to which a dichroic substance (iodine or dye) is allowed to absorb. There is no particular restriction on the thickness of the polarizer. There is no particular restriction on the thickness of the polarizer. It is, however, general to use a polarizer with a thickness of 5 to 80 μm.

The polarizer wherein a polyvinyl alcohol is dyed with iodine and uniaxially stretched may be produced by dipping a polyvinyl alcohol in an aqueous solution of iodine to be dyed and stretching it 3 to 7 times longer than the original length. If necessary, the polyvinyl alcohol-based film may be dipped in a solution of boric acid or potassium iodide. Further if necessary, the polyvinyl alcohol-based film may be dipped in water to be washed before dyeing. Washing of the polyvinyl alcohol-based film can remove stains thereon and a blocking inhibitor and swells the film thereby providing an effect to prevent uneven dyeing. Stretching may be carried out after or while dyeing with iodine or followed by dyeing with iodine. Alternatively, stretching may be carried out in an aqueous solution of boric acid or iodine or a water bath.

The protection film to be arranged on one or both surfaces of the polarizer are preferably excellent in transparency, mechanical strength, thermal stability, moisture shielding capability, and isotropy. Examples of materials of the protection film include polyester-based polymers such as polyethylene terephthalate and polyethylene naphthalate; cellulose-based polymers such as diacetyl cellulose and triacetyl cellulose; acryl-based polymers such as ploymethyl methacrylate; styrene-based polymers such as polystyrene and acrylonitrile styrene copolymers (AS resin); and polycarbonate-based polymers. Another examples include polyolefin-based polymers such as polyethylene-, polypropylene- and cycloolefin-based polyolefins, polyolefins having a norbornene structure, and ethylene propylene copolymers; vinyl chloride-based polymers; amide-based polymers such as nylon and aromatic polyamides; imide-based polymers; sulfone-based polymers; polyether sulfone-based polymers; polyetheretherketone-based polymers; polyphenylene sulfide-based polymers; vinyl alcohol-based polymers; vinylidene chloride-based polymers; vinyl butyral-based polymers; acrylate-based polymers; polyoxymethylene-based polymers; epoxy-based polymers; and blends of these polymers. Another examples include those obtained by forming acryl-, urethane-, acrylurethane-, epoxy-, and silicone-based thermal or ultraviolet curing type resins, into film. The thickness of the protection film is generally 500 μm or less, preferably from 1 to 300 μm, particularly preferably from 5 to 200 μm.

The protection film is preferably a cellulose-based polymer such as triacetyl cellulose in view of polarization characteristics and durability. Particularly preferred is a triacetyl cellulose film. When the protection film is arranged on both surface of the polarizer, the protection film on the top surface may be formed with the same or different polymer of the protection film on the bottom surface. The polarizer is attached to the protection film via a water-based tacky adhesive. Examples of the water-based tacky adhesive include polyvinyl alcohol-based adhesives, gelatin-based adhesives, vinyl-based latex, water-based polyurethanes, and water-based polyesters.

The protection film may be subjected to hard coat or anti-reflection treatment or various treatments for the purposes of anti-sticking, diffusion, or anti-glare.

The hard coat treatment is carried out for preventing scratching on the polarizing film surfaces by forming a curable film with excellent hardness or slipping characteristics, with a suitable acryl- or silicone-based ultraviolet curing resin, on the protection film surface. The anti-reflection treatment is carried out for preventing external light from reflecting on a polarizing film surface and may be achieved by forming an anti-reflection film in accordance with a conventional manner. The anti-sticking treatment is carried out for preventing adhesion between the adjacent layers.

The anti-glare treatment is carried out for preventing the inhibition of visibility of a light transmitting through the polarizing film caused by the reflection of the natural light on a polarizing film surface, by forming fine irregularities on a protection film surface by roughing such as sand blasting or embossing or by blending transparent fine particles. Examples of the fine particles to be blended for forming the fine irregularity on the protection film surface include transparent fine particles, for example, inorganic fine particles of an average particle diameter of 0.5 to 50 μm, which may be electrically conductive, such as silica, alumina, titania, zirconia, tin oxide, indium oxide, cadmium oxide, and antimony oxide and organic fine particles such as cross-linked or uncross-linked polymers. When the fine irregularity is formed on the protection film surface, the amount of the fine particles is usually from 2 to 50 parts by weight, preferably from 5 to 25 parts by weight, on the basis of 100 parts by weight of the transparent resin forming the fine surface irregularity. The anti-glare layer may also be a diffusion layer (having a function of enlarging the viewing angle) for enlarging the light transmitting through the polarizing film and thus enlarging the viewing angle.

The anti-reflection layer, anti-sticking layer, diffusion layer and anti-glare layer may be formed integrally on the protection film or may be formed as an additional optical layer separately from the transparent protection layer.

The above-described polarizing film may be used as an elliptical or circular polarizing film in the form of a laminate with a retardation film. The elliptical or circular polarizing film is now described. This polarizing film changes a linearly polarized light to an elliptically or circularly polarized light, an elliptically or circularly polarized light to a linearly polarized light, or the polarization direction thereof, due to the presence of the retardation film. In particular, as a retardation film for changing a linearly polarized light to a circularly polarized light or a circularly polarized light to a linearly polarized light, a ¼ wavelength plate is used. A ½ wavelength plate is usually used for changing the polarization direction of a linearly polarized light.

The elliptical polarizing film is effectively used so as to compensate (prevent) coloration (blue or yellow) caused by the birefringence of the liquid crystal layer of a super twisted nematic (STN) type liquid crystal display device thereby allowing the device to display the black and white image with no such coloration. Preferably, the elliptical polarizing film can control a three dimensional birefringence because coloration occurring when viewing the screen of a liquid crystal display device can be compensated (prevented). The circular polarizing film is effectively used so as to adjust the color tone of the image of a reflection type liquid crystal display device whose image is colored and also has an anti-reflection function.

The retardation film may be any of plates of various wavelengths or those for compensating coloration caused by the birefringence of a liquid crystal layer or the viewing angle. A laminate of two or more retardation films with appropriate retardations selected depending on the purpose of use can control optical characteristics such as retardation. As the retardation film, there may be used the above-exemplified retardation films and the homeotropic alignment liquid crystal film of the present invention alone or in combination with other films.

The retardation film may be used as a viewing angle compensator laminated with the polarizing film to provide a wide viewing angle polarizing film. The viewing angle compensator is a film for widening the viewing angle of the screen of a liquid crystal display device so as to allow the image to appear relatively clear even when the screen is viewed slightly from an oblique direction not vertically.

As the viewing angle compensating retardation film, there may also be used a film stretched uniaxially or biaxially or stretched in two directions crossing each other and a two-way stretched film such as a tilt alignment film. Examples of the tilt alignment film include those obtained by stretching and/or contracting a polymer film bonded to a heat contractive film under the contraction force thereof by heating and those obtained by subjecting a liquid crystal polymer film to tilt alignment. The viewing angle compensator may be used in any suitable combination for the purposes of preventing coloration due to changes in viewing angle caused by the retardation of the liquid crystal cell and enlarging the viewing angle of excellent visibility.

Alternatively, with the objective of achieving the wide viewing angle of excellent visibility, the retardation film is preferably an optically compensating retardation film comprising an optically anisotropic layer such as an aligned liquid crystal polymer layer, in particular a tilt alignment layer formed from a discotic liquid crystal polymer or a bar like liquid crystal polymer, supported on a triacetyl cellulose film.

There is no particular restriction on an optical film laminated for actual use other than those described above. For example, there may be used one or more optical layers such as a reflection plate and a transflective plate, which have been conventionally used for a liquid crystal display device. In particular, examples of such optical layers include reflection or transflection type polarizing films obtained by laminating a reflection or transflection plate on the elliptical or circular polarizer.

The reflection type polarizing film comprises the polarizing film and a reflection layer arranged thereon and is used in a liquid crystal display device which displays images by reflecting an incident light from the viewing side (displaying side) and thus has an advantage that it can be thinned because no light source such as a backlight is not necessarily built-in. The reflection type polarizing film may be formed by any suitable method wherein a reflection layer of metal is overlaid on one surface of the polarizing film if necessary via a transparent protection layer.

Specific examples of the reflection type polarizing film include those obtained by overlaying a foil or vacuum deposited film of a reflective metal such as aluminum on one surface of a protection film, which surface may be subjected to a matt treatment if necessary. Another examples include those having a reflection layer with fine irregularity formed on a protection film with fine irregularity obtained by blending fine particles thereto. The reflection layer with fine irregularity has advantages that it can prevent directivity or dazzling appearance and suppress unevenness in contrast by reflect diffusely an incident light. The fine particle-containing protection film has advantages that unevenness in contrast can be suppressed more because an incident light or reflected light thereof is diffused when it transmits through the protection film. The reflection layer with fine irregularity corresponding to that of the protection film may be formed by overlaying metal on the surface of the protection film using a suitable method such as vacuum deposition, ion-plating, or sputtering.

Instead of overlaying the reflection plate directly on the protection film of the polarizing film, the reflection plate may be used in the form of a reflection sheet comprising a reflection layer and a suitable film like the transparent film forming the protection film. Since the reflection layer is usually formed of metal, it is preferably used, with its reflection surface covered with a protection film or the polarizing film with the objective of preventing the reflectivity from diminishing due to oxidation, maintaining the initial reflectivity for a long period of time, and avoiding the necessity of overlaying an additional protection layer.

The transflection type polarizing film may be obtained by forming on the polarizing film a transflection type reflection layer such as a half-mirror, reflecting the above-mentioned light and transmitting the other light. The transflection type polarizing film is generally arranged on the rear side of the liquid crystal cell of a liquid crystal display device which displays images by reflecting an incident light from the viewing side (displaying side) when the device is used under relatively bright conditions and displays images with the aide of a built-in light source such as a backlight built-in the rear side of the transflection type polarizing film when the device is used under relatively dark conditions. That is, the transflection type polarizing film is effectively used for a liquid crystal display device which can save energy required for the use of a light source such as a backlight under bright conditions and can use a built-in light source under relatively dark conditions.

The polarizing film may be a laminate of the polarizing film and two or more optical layers, just like the above-described polarization-separative type polarizers. Therefore, the polarizing film may be a reflection or transflection type elliptical polarizing film which is a combination of the above-described reflection or transflection type polarizing film and a retardation film.

The elliptical polarizing film or reflection type elliptical polarizing film comprises the polarizing film or the reflection type polarizing film and a retardation film laminated in a suitable combination. The elliptical polarizing film may be formed by laminating a (reflection type) polarizing film and a retardation film individually and sequentially so as to be a combination thereof during the process of producing a liquid crystal display device. However, it is advantageous to use an optical film produced by laminating the polarizing film and the retardation film beforehand because the optical film is excellent in quality stability and lamination workability, leading to an improvement in the production efficiency of a liquid crystal display device or the like.

On the optical film of the present invention may be formed a tacky adhesive layer. The tacky adhesive layer may be used for bonding the optical film to a liquid crystal cell or for laminating optical layers. When the optical film is bonded, the optical axis may be oriented at an appropriate angle depending on the intended retardation characteristics.

There is no particular restriction on the tacky adhesive forming the layer thereof. Examples of the tacky adhesive include those used for laminating the homeotropic alignment liquid crystal film and the substrate for transferring. The tacky adhesive layer may be provided in the same manner.

The tacky adhesive layer may be arranged in the form of an overlaid layer of those with different compositions or types, on one or both surfaces of the polarizing film or optical film. When the tacky adhesive layer is arranged on both surfaces, the tacky adhesive layer on the top surface of the polarizing film or optical film may be the same as or different from that on the bottom surface. The thickness of the tacky adhesive layer may be determined depending on the purpose of use or bond strength and is generally from 1 to 500 µm, preferably from 5 to 200 µm, particularly preferably from 10 to 100 µm.

The exposed surface of the tacky adhesive layer is temporarily covered with a separator before use for the purpose of preventing the layer from being contaminated. Whereby, any access to the tacky adhesive layer can be prevented during the normal handling. The separator may be any suitable separator which has been conventionally used, such as those obtained by coating a releasing agent such as silicone-, long-chain alkyl-, fluorine-based agent or molybdenum sulfide on a suitable foliate body such as plastic films, rubber sheets, paper, cloth, unwoven fabric, net, foamed sheets, metal foils, and laminates thereof.

In the present invention, the polarizer, transparent protection film, optical film or tacky adhesive layer forming the above-described polarizing film may be treated with an ultraviolet absorber selected from salicylic acid ester-based compounds, benzophenone-based compounds, benzotriazole-based compounds, cyanoacrylate-based compounds, and nickel complex salt-based compounds so as to have ultraviolet absorptivity.

The optical films of the present invention are preferably used for producing various devices such as liquid crystal display devices. Particularly preferably, the optical films are used as viewing angle improvement films for liquid crystal display devices.

The liquid crystal display device may be produced by any conventional method. That is, the liquid crystal display device is generally produced by assembling components such as a liquid crystal cell, optical films and if necessary an illumination system and incorporating thereto a driving circuit. However, there is no particular restriction on the method except for using the optical films of the present invention. Therefore, the liquid crystal display device may be produced in accordance with any conventional method. There is no particular restriction on the type of the liquid crystal devices to be produced, which may, therefore, be any of various liquid crystal display devices such as transmissive, reflective and transflective liquid crystal devices.

Examples of such liquid crystal cell modes include TN (Twisted Nematic), STN (Super Twisted Nematic), VA (Vertical Alignment), MVA (multi-domain vertical alignment), OCB (Optically Compensated Bend), ECB (Electrically Controlled Birefringence), HAN (Hybrid-Aligned Nematic), IPS (In-Plane Switching), Bistable Nematic, ASM (Axially Symmetric Aligned Microcell), Half Tone Gray Scale modes, and display modes using a ferroelectric liquid crystal and an antiferroelectric liquid crystal.

The liquid crystal alignment in the cell may have a single directionality in the cell plane and may be used in a liquid crystal display device wherein the alignment is divided. Examples of the liquid crystal display devices with regard to methods of applying an electric voltage to the liquid crystal cell include those driven in a passive mode using ITO electrodes and an active mode using TFT (Thin Film Transistor) electrodes and TFD (Thin Film Diode) electrodes.

A liquid crystal display device may be produced wherein a polarizing film and an optical film are individually arranged on one or both surfaces of the liquid crystal cell or wherein a backlight or a reflection plate is used as an illumination system. Here, the optical film of the present invention may be arranged on one or both sides of the liquid crystal cell. When the polarizing film and optical film are arranged on both sides of the liquid crystal cell, the polarizing film and optical film on the upper side may be the same as or different from those arranged on the lower side. Furthermore, one or more suitable components such as a diffusive plate, an anti-glare layer, an anti-reflection film, a protection plate, a prism array, a lens array sheet, a light diffusing plate, and a backlight may be arranged at appropriate positions in a liquid crystal display device.

The present invention also provides a laminated retardation film comprising a liquid crystal layer comprising a liquid crystalline substance containing a side chain liquid crystalline compound having an oxetanyl group as a constituent, aligned homeotropically on an alignment substrate while the substance is in a liquid crystal state and fixed in the homeotropic alignment by allowing the oxetanyl group to react, and a stretched film with a retardation function integrally laminated on the liquid crystal layer.

The liquid crystal layer comprising a liquid crystalline substance containing a side chain liquid crystalline compound having an oxetanyl group as a constituent, aligned homeotropically on an alignment substrate while the substance is in a liquid crystal state and fixed in the homeotropic alignment by allowing the oxetanyl group to react can be quantified by measuring the retardation of the liquid crystal layer at an angle tilted from the vertical incident.

When the main refraction indices in the plane are $Nx1$ and $Ny1$, the refraction index in the thickness direction is $Nz1$ and the thickness $d1$ ($\mu m$)=on the order of 1 to 10 in the resulting homeotropic alignment liquid crystal layer, ($Nx1-Ny1$)=on the order of 0 to 0.0005, and ($Nx1-Nz1$)=on the order of $-0.1800$ to $-0.2000$ for liquid crystal layers produced using the materials in Examples described below. In general, $Nx1$=on the order of 1.53 to 1.55, $Ny1$=on the order of 1.53 to 1.55, and $Nz1$=on the order of 1.72 to 1.74.

When $Nz1>Nx1 \geq Ny1$ in the homeotropic alignment liquid crystal layer used in the laminated retardation film, the retardation value in the plane ($Re1=(Nx1-Ny1) \times d1$ [nm]) is preferably from 0 to 50 nm, and the retardation value in the thickness direction ($Rth1=(Nx1-Nz1) \times d1$ [nm]) is preferably from $-500$ to $-30$ nm.

The Re1 and Rth1 values which are optical parameters of the homeotropic alignment liquid crystal layer can not be determined with certainty because they depend on the usage such as whether the layer is used as a brightness enhancement film or a viewing angle improvement film for a liquid crystal display device and further depend on the display mode of the liquid crystal display device and various optical parameters when the layer is used as a viewing angle improvement film. However, with respect to a monochromic light of 550 nm, the retardation value (Re1) in the homeotropic alignment liquid crystal layer plane is adjusted to usually from 0 nm to 50 nm, preferably from 0 nm to 20 nm, more preferably from 0 nm to 5 nm and the retardation value (Rth1) in the thickness direction is adjusted to usually from $-500$ to $-30$ nm, preferably $-400$ to $-50$ nm, more preferably from $-400$ to $-100$ nm.

Adjustment of the Re1 and Rth1 values within the above ranges results in a viewing angle improvement film for a liquid crystal display device which can widen the viewing angle while compensating the color tone of the images and results in a brightness enhancement film which can provide excellent brightness enhancement effect. When the Re1 value is larger than 50 nm, the front characteristics of the liquid crystal display device would be degraded due to the large front retardation value. When the Rth1 value is larger than $-30$ nm or smaller than $-500$ nm, sufficient viewing angle improving effect may not be attained or unnecessary coloration may occur when viewing the device obliquely.

Next, the stretched film having a retardation function will be described.

Examples of the stretched film include birefringence films obtained by stretching a suitable polymer such as polycarbonates, norbornene resins, polyvinyl alcohols, polystyrenes, polymethyl methacrylates, polypropylenes, and other polyolefins, polyarylates, and polyamides; aligned films formed from liquid crystal materials such as liquid crystal polymers; and aligned layers of a liquid crystal material supported on a film.

When the main refraction indices in the plane are Nx2 and Ny2, the refraction index in the thickness direction is Nz2, Nx2>Ny2 and the thickness d2 (μm)=on the order of 25 to 30 in the stretched film, (Nx2−Ny2)=on the order of 0.0040 to 0.0060, and (Nx2−Nz2)=on the order of 0.0040 to 0.0060 for stretched films produced using the materials in Examples described below. In general, Nx2=on the order of 1.593 to 1.5942, Ny2=on the order of 1.5850 to 1.5887, and Nz2=on the order of 1.5850 to 1.5833.

When Nx2>Ny2 in the stretched film having a retardation function film, the retardation value in the plane (Re2=(Nx2−Ny2)×d2 [nm]) is preferably from 30 to 500 nm, and the retardation value in the thickness direction (Rth2=(Nx2−Nz2)×d2 [nm]) is preferably from 30 to 300 nm.

The Re2 and Rth2 values which are optical parameters of the stretched film having a retardation function can not be determined with certainty because they depend on the usage such as whether the layer is used as a brightness enhancement film or a viewing angle improvement film for a liquid crystal display device and further depend on the display mode of the liquid crystal display device and various optical parameters when the layer is used as a viewing angle improvement film. However, with respect to a monochromic light of 550 nm, the retardation value (Re2) in the stretched film plane is adjusted to usually from 30 nm to 500 nm, preferably from 50 nm to 400 nm, more preferably from 100 nm to 300 nm and the retardation value (Rth2) in the thickness direction is adjusted to usually from 30 to 300 nm, preferably 50 to 200=n, more preferably from 70 to 150 nm.

Adjustment of the Re2 and Rth2 values within the above ranges results in a viewing angle improvement film for a liquid crystal display device which can widen the viewing angle while compensating the color tone of the images and results in a brightness enhancement film which can provide excellent brightness enhancement effect. When the Re2 value is smaller than 30=n or larger than 500 nm, sufficient viewing angle improving effect may not be attained or unnecessary coloration may occur when viewing the device obliquely. When the Rth2 value is smaller than 30 nm and larger than 300 nm, sufficient viewing angle improving effect may not be attained or unnecessary coloration may occur when viewing the device obliquely.

The laminated retardation film of the present invention may be produced by forming the homeotropic alignment liquid crystal layer on the stretched film having a homeotropic alignability and retardation function, as a substrate. Alternatively, the laminated retardation film may be produced by transferring the homeotropic alignment liquid crystal layer formed on an alignment substrate having a homeotropic alignability to the stretched film having a retardation function via a tacky adhesive layer.

There is no particular restriction on the tacky adhesive forming the tacky adhesive layer. There may be used any tacky adhesive appropriately selected from those containing a polymer such as an acrylic polymer, a silicone-based polymer, a polyester, a polyurethane, a polyamide, a polyether, a fluorine- or rubber-based polymer as a base polymer. In particular, it is preferred to use a tacky adhesive such as an acrylic tacky adhesive which is excellent in optical transparency and in weather resistance and heat resistance and exhibits tackiness characteristics such as moderate wetness, cohesivity and adhesivity.

The formation of the tacky adhesive layer may be carried out by any suitable method. As an example, there is a method wherein a base polymer or a composition thereof is dissolved or dispersed in a solvent containing toluene or ethyl acetate alone or in combination thereby obtaining a tacky adhesive solution containing 10 to 40 percent by mass of the adhesive, which solution is then directly laid over the above-described substrate or liquid crystal film by an appropriate developing method such as casting or coating or alternatively wherein a tacky adhesive layer is formed in accordance with the method as described above on a separator and then transferred onto the liquid crystal layer. The tacky adhesive layer may contain additives such as natural or synthetic resins, in particular fillers or pigments containing tackiness-imparting resins, glass fibers, glass beads, metal powders, and other inorganic powders, dyes, anti-oxidants. The tacky adhesive layer may contain fine particles so as to exhibit light diffusivity.

When the homeotropic alignment liquid crystal film formed on a substrate is transferred via a tacky adhesive layer to the stretched film having a retardation function, the homeotropic alignment liquid crystal film may be subjected to a surface treatment so as to enhance the adhesion to the tacky adhesive layer. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

The resulting laminated retardation film may be used in the form of a laminate with an optical film such as a polarizing film.

Alternatively, the laminated retardation film of the present invention may be laminated with a cholesteric liquid crystal film so as to form a brightness enhancement film. This brightness enhancement film may be produced by laminating a polarizer, the laminated retardation film wherein the stretched film whose Re2 is from 100 to 170 nm, having a retardation function and the homeotropic alignment liquid crystal layer are laminated, and a cholesteric liquid crystal film in this order, and is a linear polarizing film with an extremely large brightness enhancing function.

The cholesteric liquid crystal film may be any of those described above.

The laminated retardation film or brightness enhancement film of the present invention may be provided with a tacky adhesive layer. The tacky adhesive layer may be used for bonding the film to a liquid crystal cell or for laminating the film with other optical films such as the above-described retardation film or stretched film. When the optical film is bonded to the laminated retardation film or brightness enhancement film, the optical axes may be oriented at an appropriate angle depending on the intended retardation characteristics.

There is no particular restriction on the tacky adhesive forming the layer thereof. Examples of the tacky adhesive include those used for laminating the above-described homeotropic alignment liquid crystal film and transmissive film. The tacky adhesive layer may be provided in the same manner.

The laminated retardation film and brightness enhancement film of the present invention is preferably used for producing various devices such as liquid crystal display devices and particularly preferably used as a viewing angle improvement film for a liquid crystal display device.

The present invention also provides a viewing angle compensator for a vertical alignment type liquid crystal display device, comprising a liquid crystal film comprising a liquid crystalline substance containing a side chain liquid crystalline compound having an oxetanyl group, as a constituent, aligned homeotropically while the substance is in a liquid crystal state and fixed in the homeotropic alignment by allowing the oxetanyl group to react.

When the thickness is d1, the main refraction indices in the plane are Nx1 and Ny1, the refraction index in the thickness direction is Nz1 and Nz1>Nx1≧Ny1 in the homeotropic alignment liquid crystal layer used in a viewing angle compensator for a vertical alignment type liquid crystal display device, the retardation value in the plane (Re1=(Nx1−Ny1)×d1 [nm]) is preferably from 0 to 20 nm, and the retardation value in the thickness direction (Rth1=(Nx1-Nz1)×d1 [nm]) is preferably from −500 to −30 nm.

The Re1 and Rth1 values which are optical parameters of the homeotropic alignment liquid crystal layer can not be determined with certainty because they depend on the display mode of the liquid crystal display device and various optical parameters. However, with respect to a monochromic light of 550 nm, the retardation value (Re1) in the homeotropic alignment liquid crystal film plane is adjusted to usually from 0 nm to 20 nm, preferably from 0 nm to 10 nm, more preferably from 0 nm to 5 nm and the retardation value (Rth1) in the thickness direction is adjusted to usually from −500 to −30 nm, preferably −−400 to −50 nm, more preferably from −400 to −100 nm.

Adjustment of the Re1 and Rth1 values within the above ranges results in a viewing angle improvement film for a liquid crystal display device which can widen the viewing angle while compensating the color tone of the images. When the Re1 value is larger than 20 nm, the front characteristics of the liquid crystal display device would be degraded due to the large front retardation value. When the Rth1 value is larger than −30 nm or smaller than −500 nm, sufficient viewing angle improving effect may not be attained or unnecessary coloration may occur when viewing the device obliquely.

Next, a vertical alignment type liquid crystal display device with the viewing angle compensator therefor will be described.

The vertical alignment type liquid crystal display device of the present invention comprises a vertical alignment type liquid crystal cell containing a pair of substrates each having an electrode and a liquid crystal molecules to be aligned vertically to the substrate surface when no electric voltage is applied, arranged between the substrates; two linear polarizing films arranged above and below the liquid crystal cell; and first optical anisotropic elements exhibiting a retardation of ¼ wavelength in the plane, arranged between both surfaces of the liquid crystal cell and the linear polarizing films, wherein at least one viewing angle improvement film described above is arranged between the linear polarizing films and the first optical anisotropic element.

Preferably, between the first optical anisotropic element and the viewing angle improvement film is arranged a second optical anisotropic element exhibiting a retardation of ½ wavelength in the plane. Preferably, between the first optical anisotropic elements and one or both surfaces of the liquid crystal cell is arranged at least one third optical anisotropic element having a negative uniaxial optical anisotropy in the thickness direction. Addition of the third optical anisotropic element can achieve the wider viewing angle.

There is no particular restriction on the liquid crystal devices to be produced, which may, therefore, be any of various liquid crystal display devices such as transmissive, reflective and transflective liquid crystal devices. There is no particular restriction on the driving mode of the liquid crystal cell, either, which may, therefore, be a passive matrix mode used in an STN-LCD, an active matrix mode using active electrodes such as TFT (Thin Film Transistor) electrodes and TFD (Thin Film Diode) electrodes, and a plasma address mode.

There is no particular restriction on the transparent substrates forming the liquid crystal cell as long as they can align a liquid crystalline material forming a liquid crystal layer in a specific direction. More specific examples include those which themselves have a property of aligning a liquid crystalline material and those which themselves have no capability of aligning but are provided with an alignment layer capable of aligning a liquid crystalline material. The electrode of the liquid crystal cell may be any conventional electrode, such as ITO. The electrode may be usually arranged on the surface of the transparent substrate, which surface contacts the liquid crystal layer. In the case of using a transparent substrate with an alignment layer, an electrode is provided between the alignment layer and the transparent substrate.

There is no particular restriction on the liquid crystalline material forming the liquid crystal layer as long as it is a material exhibiting a negative dielectric anisotropy. Examples of such materials include various low molecular weight liquid crystal substances, polymeric liquid crystal substances, and mixtures thereof, which can form various liquid crystal cells. The liquid crystalline material may be blended with dyes, chiral dopoants, or non-liquid crystalline substances to an extent that they do not prevent the liquid crystal substance from exhibiting liquid crystallinity. When an electric voltage is applied to the vertical alignment liquid crystal film of a liquid crystal material exhibiting a negative dielectric anisotropy so as to rotate the liquid crystal molecule, the rotation can be made stable by addition of a chiral dopant. Furthermore, when the rubbing directions of the upper and lower substrates are arranged in a direction other than the same direction, streaking is hard to be visible because the orbit of the alignment will not be in the same direction. When the liquid crystal layer is twisted at 90 degrees, retardation occurs in the tilt direction of the liquid crystal molecules when are aligned, tilted at a few degrees to the substrates for preventing disclination upon application of an electric voltage. However, since the directions of the liquid crystal molecules near the substrates form an angle of 90 degrees near the upper and lower substrates, the disclination can be cancelled, leading to a black image with less leak light.

The two linear polarizing films arranged above and below the vertical alignment liquid crystal cell are usually those having a protection film on one or both surfaces of the polarizers.

A circular polarizing film can be formed by combining the linear polarizing film and a ¼ wavelength plate. The circular polarizing film has a function to change a linearly polarized light to a circularly polarized light or a circularly polarized light to a linearly polarized light due to the presence of the ¼ wavelength plate.

Presence of the linearly polarizing films arranged on both surfaces of the vertical alignment liquid crystal cell and the first optical anisotropic elements having a retardation of ¼ wavelength in the plane, arranged between the linear polarizing films and the vertical alignment liquid crystal cell allows for display of dark image by crossing the upper and lower polarizing films because the retardation in the viewing direction of the liquid crystal becomes zero when no electric voltage is applied and allows for display of bright image because the retardation in the viewing angle occurs when an electric voltage is applied. In this case, because the angle defined by the slow axis of the first optical anisotropic element having a retardation of ¼ wavelength and the absorption axis of the linear polarizing film is 45 degrees, it is rendered possible to make an incident of circularly polarized light to the liquid crystal layer with the most simple structure.

In the case of a transflective vertical alignment type liquid crystal display device provided with both transmission and reflection capabilities, it is preferred to use a first optical anisotropic element having a retardation of ¼ wavelength in the whole wavelength or use a second optical anisotropic element having a retardation of ½ wavelength in the plane, between the linear polarizing film and the ¼ wavelength plate.

Next, the first and second optical anisotropic elements having a retardation of ¼ wavelength and a retardation of ½ wavelength in the plane, respectively will be described.

Examples of these optical anisotropic elements include birefringence films obtained by uniaxially or biaxially stretching films formed from appropriate polymers such as polycarbonates, norbornene resins, polyvinyl alcohols, polystyrenes, polymethyl methacrylates, polypropylenes, other polyolefins, polyarylates, and polyamides or by a method as disclosed in Japanese Patent Laid-Open Publication No 5-157911 wherein such polymer films of an elongate form, with a heat contractive film attached thereto are heat-contracted with the action thereof in the width direction so as to increase the retardation in the thickness direction; aligned films formed from liquid crystal materials such as liquid crystal polymers; and aligned layers of liquid crystal materials supported on a film.

When the X axis and Y axis directions are defined in the plane and the thickness direction is defined as z, a positive uniaxial optical anisotropic element has a refractive index defined by nx>ny=nz. A positive biaxial anisotropic element has a refractive index defined by nx>nz>ny. A negative uniaxial optical anisotropic element has a refractive index defined by nx=ny>nz. A negative biaxial anisotropic element has a refractive index defined by nx>ny>nz.

When the biaxiality is defined by NZ coefficient=(nx−nz)/(nx−ny), NZ>1, NZ=1, and NZ<1 can be classified into negative biaxiality, positive uniaxiality, and positive biaxiality, respectively.

When the thickness is d2, the main refractive indices in the plane are Nx2 and Ny2, the main refractive index in the thickness direction is Nz2, and Nx2>Ny2 in the first optical anisotropic element having a retardation of ¼ wavelength in the plane, the element has a retardation value in the plane (Re2=(Nx2−Ny2)×d2 [nm]) of 80 to 170 nm and a relationship defined by −1<NZ2<4 when the NZ coefficient of the element is NZ2.

The Re2 and NZ2 values which are optical parameters of the first optical anisotropic element can not be determined with certainty because they depend on the display mode of the liquid crystal display device and various optical parameters. However, with respect to a monochromic light of 550 nm, the retardation value (Re2) in the first optical anisotropic element plane is adjusted to usually from 80 nm to 170 nm, preferably from 100 nm to 150 nm, more preferably from 120 nm to 140 nm and the NZ2 value is adjusted to usually −1<NZ2<4, preferably 0.5<NZ2<3, more preferably 1≦NZ2<3.

When the thickness is d3, the main refractive indices in the plane are Nx3 and Ny3, the main refractive index in the thickness direction is Nz3, and Nx3>Ny3 in the second optical anisotropic element having a retardation of ½ wavelength in the plane, the element has a retardation value in the surface (Re3=(Nx3−Ny3)×d3 [nm]) of 200 to 350 nm and a relationship defined by −1<NZ3<4 when the NZ coefficient of the element is NZ3.

The Re3 and NZ3 values, which are optical parameters of the second optical anisotropic element can not be determined with certainty because they depend on the display mode of the liquid crystal display device and various optical parameters. However, with respect to a monochromic light of 550 nm, the retardation value (Re3) in the second optical anisotropic element plane is adjusted to usually from 200 nm to 350 nm, preferably from 250 nm to 300 nm, more preferably from 260 nm to 280 nm and the NZ3 value is adjusted to usually −1<NZ3<4, preferably −1<NZ3<2, more preferably 0≦NZ3<1.5.

Adjustment of the Re2 and Re3 values and NZ2 and NZ3 values within the above ranges results in a viewing angle improvement film for a liquid crystal display device which can widen the viewing angle while compensating the color tone of the images. When the Re2 and Re3 values deviated from the above ranges, the front characteristics of the liquid crystal display device would be degraded due to the deviance of the front retardation value. When the NZ2 and NZ3 values deviate from the above ranges, sufficient viewing angle improving effect may not be attained or unnecessary coloration may occur when viewing the device obliquely.

Next, the third optical anisotropic element having a negative optical anisotropy in the thickness direction will be described.

There is no particular restriction on the third optical anisotropic element. The third optical anisotropic element may be formed from a non-liquid crystalline material or a liquid crystalline material. Preferred examples of the non-liquid crystalline material include polymers, for example, cellulose triacylate, polyolefins such as ZEONEX and ZEONOR (manufactured by ZEON CORPORATION) and ARTON (manufactured by JSR Corporation), polyamides, polyimides, polyesters, polyetherketones, polyaryletherketones, polyamideimides, and polyesterimides because of their excellent heat resistance, chemical resistance, transparency, and rigidity. These polymers may be used alone or in combination. Alternatively, these polymers may be used in the form of a mixture of two or more of these polymers having different functional groups from each other, such as polyaryletherketone and polyamide. Among these polymers, particularly preferred are polyimides because of their high transparency and alignability. Examples of the liquid crystalline material include cholesterically aligned film formed from liquid crystal materials such as cholesteric liquid crystal polymers and cholesterically aligned layers of liquid crystal materials supported on a film.

When the thickness is d4, the main refractive indices in the plane are Nx4 and Ny4, the main refractive index in the thickness direction is Nz4, and Nx4≧Ny4 in the third optical anisotropic element, the element has a retardation value in the plane (Re4=(Nx4−Ny4)×d4 [nm]) of preferably from 0 to 20 nm and a retardation value in the thickness direction (Rth4=(Nx4−Nz4)×d4 [nm]) of preferably from 50 to 500 nm.

The Re4 and Rth4 values, which are optical parameters of the third optical anisotropic element can not be determined with certainty because they depend on the display mode of the liquid crystal display device and various optical parameters. However, with respect to a monochromic light of 550 nm, the retardation value (Re4) in the third optical anisotropic element plane is adjusted to usually from 0 nm to 20 nm, preferably from 0 nm to 10 nm, more preferably from 0 nm to 5 nm and the retardation value (Rth4) in the thickness direction is adjusted to usually from 50 to 500 nm, preferably 80 to 400 nm, more preferably from 100 to 300 nm.

Adjustment of the Re4 and Rth4 values within the above ranges results in a viewing angle improvement film for a liquid crystal display device which can widen the viewing angle while compensating the color tone of the images. When the Re4 value is larger than 20 nm, the front characteristics of the liquid crystal display device would be degraded due to the large front retardation value. When the Rth4 value is smaller than 50 nm or larger than 500 nm, sufficient viewing angle improving effect may not be attained or unnecessary coloration may occur when viewing the device obliquely.

The first, second and third optical anisotropic elements and the homeotropic alignment liquid crystal film may be laminated to each other via a tacky adhesive layer. Alternatively, after the homeotropic alignment liquid crystal film formed on a substrate may be transferred via a tacky adhesive layer to the first or second optical anisotropic element, the third optical anisotropic element which has not been used may be further laminated thereto via a tacky adhesive layer.

When the homeotropic alignment liquid crystal film formed on a substrate is transferred via a tacky adhesive layer to the first or second optical anisotropic element, the homeotropic alignment liquid crystal film may be subjected to a surface treatment so as to enhance the adhesion to the tacky adhesive layer. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

One of the substrates of the above-described vertical alignment type liquid crystal cell may be changed to a substrate having a region with reflectivity and a region with transmissivity thereby obtaining a transflective vertical alignment type liquid crystal display device.

There is no particular restriction on the region with reflectivity (hereinafter may be referred to as "reflection region") contained in the transflective electrode, which may, therefore, be a metal such as aluminum, silver, gold, chromium, and platinum, an alloy containing one or more of these metals, an oxide such as magnesium oxide, a multi-layered film of dielectrics, a liquid crystal film exhibiting a selective reflectivity, and combinations thereof. These reflection layers may be flat or curved and may be those provided with diffusive reflectivity by forming irregularity on its surface, those having a function as the electrode on the electrode substrate located on the side opposite to the viewing side, or any combination thereof.

The vertical alignment type liquid crystal display device of the present invention may be provided with components other than those described above. For example, the use of a color filter makes it possible to produce a color liquid crystal display which can provide multi- or full-colored images with increased color purity.

Next, the organic electroluminescence device (organic EL display device) of the present invention will be described. In general, an EL display device comprises an illuminant (organic electroluminescent illuminant) formed by laminating a transparent electrode, an organic illumination layer, and a metal electrode in this order on a transparent substrate. The organic illumination layer is a laminate of various organic films and for example is known to be of various structures such as a laminate of a hole injection layer of a triphenylamine derivative and an illumination layer of a fluorescent organic solid such as anthracene; a laminate of such an illumination layer and an electron injection layer of a perylene derivative, and a laminate of such a hole injection layer, an illumination layer, and an electron injection layer.

The organic EL display device illuminates on the basis of the principle that when an electric voltage is applied to the transparent electrode and the metal electrode, causing holes and electrons to be injected to the organic illumination layer, the energy generated by the re-coupling of the holes and electrons excites the fluorescent substance and a light is illuminated when the excited fluorescent substance returns to a ground state. The re-coupling is the same in mechanism as an ordinary diode. As anticipated from this, the current and luminescence intensity exhibit strong non-linearity accompanying rectification characteristics to the applied electric voltage.

In the organic EL display device, at least one of the electrodes must be transparent in order to take out the light illuminated in the organic illumination layer, and thus a transparent electrode formed from a transparent conductive material such as Indium Tin Oxide (ITO) is usually used as an anode. While, since it is important to use a substance which is small in work-function for a cathode in order to make the injection of electrons easy and thus increase the illumination efficiency, a metal electrode such as Mg—Ag and Al—Li is used.

In the organic EL display device with the above-described structure, the organic illumination layer is formed of an extremely thin film with a thickness of on the order of 10 nm. The organic illumination layer thus also transmits light substantially completely, similarly to the transparent electrode. Consequently, since during the non-illumination mode, the light made incident through the transparent substrate transmits through the transparent electrode and organic illumination layer, and then reflects at the metal electrode and then appears on the surface of the transparent substrate again, the displaying surface of the organic EL display device look like a mirror when viewed from the outside.

In the organic EL display device wherein the organic illumination layer illuminating upon application of an electric voltage is provided with on its top surface with a transparent electrode and on its bottom surface with a metal electrode, a polarizing film may be provided on the top surface side of the transparent electrode, and a retardation film may be provided between the transparent electrode and the polarizing film.

The retardation film and polarizing film has an action to polarize a light externally made incident and reflected at the metal electrode and thus an effect not to make the mirror surface of the metal electrode visible with the action. In particular, when the retardation film is formed with a ¼ wavelength plate and the angle formed by the polarization directions of the polarizing film and retardation film is adjusted to ¼, the mirror surface of the metal electrode can be completely shielded.

That is, for the environment light made incident to the organic EL display device, only the linearly polarized component transmits therethrough due to the presence of the polarizer. This linearly polarized light becomes an elliptically polarized light due to the presence of the retardation film but becomes a circularly polarized light in particular when the retardation film is a ¼ wavelength plate and the angle formed by the polarization directions of the polarizing film and retardation film is adjusted to $\pi/4$.

The circularly polarized light becomes a linearly polarized light again at the retardation film after transmitting through the transparent substrate, transparent electrode, and organic thin film, reflected at the metal electrode and transmitting through the organic thin film, transparent electrode, and transparent substrate. The linearly polarized light crosses with the polarization direction of the polarizing film and thus can not transmit therethrough. As the result, the mirror surface of the metal electrode can be completely shielded.

The polarizing film containing the homeotropic alignment liquid crystal film of the present invention can be suitably used for the organic EL display device.

APPLICABILITY IN THE INDUSTRY

The present invention can provide a homeotropic alignment liquid crystal film with excellent heat resistance, high rigidity, and excellent mechanical strength, produced by fixing a liquid crystal material containing a side chain liquid crystalline polymeric compound obtained by polymerizing a novel (meth)acrylic compound having an oxetanyl group, in an aligned state. The liquid crystal film can be used as an optical film for various image displaying devices such as liquid crystal display devices, organic EL display devices, and PDP.

BEST MODE FOR CARRYING OUT THE PRESENT INVENTION

The present invention will be further described in the following examples, but the present invention should not be construed as being limited thereto.

The analyzing methods used in the examples are as follows.

(1) $^1$H-NMR Measurement

A compound was dissolved in deuterated chloroform and was determined by means of $^1$H-NMR at 400 MHz (INOVA-400 manufactured by Varinat Co., Ltd.).

(2) GPC Measurement

The GPC measurement was carried out to determine the number-average molecular weight (Mn) and weight-average molecular weight (Mw) of a liquid crystalline polymer by dissolving the compound in tetrahydrofuran and using 8020 GPC system manufactured by TOSOH CORPORATION equipped with TSK-GEL, Super H1000, Super H2000, Super H3000, and Super H4000 which are connected in series and tetrahydrofuran as an eluent solvent. Polystyrene was used as a standard for calibration of the molecular weight.

(3) Observation through Microscope

The liquid crystal aligned state was observed using an Olympus BH2 polarizing microscope.

(4) Parameter Measurement of Liquid Crystal Film

The measurement was carried out using an automatic birefringence analyzer KOBRA21ADH manufactured by Oji Scientific Instruments.

Example 1

A liquid crystalline polymer represented by formula (8) below was synthesized by radical polymerization. With regard to the molecular weight in terms of polystyrene, Mn=8000 and Mw=15000. The representation in formula (8) indicates the structural ratio of the monomer but does not mean a block copolymer. The same is also applied to formulas (9) through (13) below.

In 9 ml of cyclohexanone was dissolved 1.0 g of the polymer of formula (8), followed by addition of 0.1 g of a propylene carbonate solution of 50 percent of triarylsulfonium hexafluoroantimonate (a reagent manufactured by Aldrich Co.) at a dark place and filtration of insolubles with a polytetrafluoroethylene filter with a pore size of 0.45 µm thereby obtaining a liquid crystal material solution.

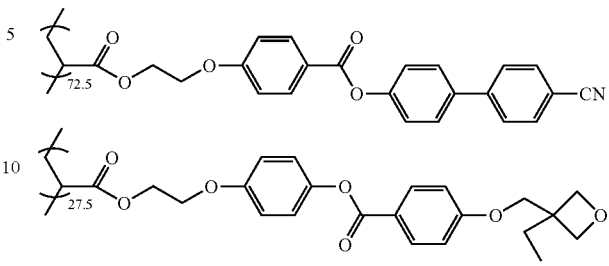

(8)

An alignment substrate was prepared as follows.

A polyethylene terephthalate film with a thickness of 38 µm (manufactured by Toray Industries Inc.) was cut into a size of 15 cm square and spin-coated with a solution of 5 percent by weight of an alkyl-modified polyvinyl alcohol (MP-203 manufactured by KURARAY CO., LTD.) (solvent is a mixed solvent of water and isopropyl alcohol at a weight ratio of 1:1). The coated film was dried on a hot plate kept at 50° C. for 30 minutes and heated at 120° C. in an oven for 10 minutes. The thickness of the resulting PVA layer was 1.2 µm. The PVA layer was rubbed with a rayon cloth. The peripheral velocity ratio (the moving velocity of the rubbing cloth/the moving velocity of the substrate film) was set to 4.

On the resulting alignment substrate was spin-coated the liquid crystal material solution obtained above. The coated alignment substrate was dried on a hot plate kept at 60° C. for 10 minutes and heated at 150° C. in an oven for 2 minutes thereby aligning the liquid crystal material. The sample was placed on an aluminum plate heated at 60° C., making contact therewith and irradiated with an ultraviolet light of 600 mJ/cm$^2$ (measured at 365 nm) using a high pressure mercury lamp thereby curing the liquid crystal material.

Since the polyethylene terephthalate film used as a substrate was large in birefringence and thus not preferable for an optical film, the resulting liquid crystal film (cured liquid crystal material layer) on the alignment substrate was transferred via an ultraviolet curing type adhesive onto a triacetylcellulose (TAC) film. More specifically, the adhesive with a thickness of 5 µm was coated over the cured liquid crystal material layer on the polyethylene terephthalate film and laminated with a TAC film. After the laminate was subjected to an irradiation of ultraviolet light from the TAC film side so as to cure the adhesive, the polyethylene terephthalate film was released.

As a result of observation of the resulting optical film (PVA layer/liquid crystal layer/adhesive layer/TAC film) through a polarizing microscope, it was confirmed that the film was aligned in a monodomain uniform aligned state having no disclination. As result of observation of the optical film through a conoscope, it was confirmed that the alignment was a homeotropic alignment having a positive uniaxial refraction structure. As the result of measurement using KOBRA21ADH, the combination of the TAC film and the liquid crystal layer was found to have a retardation in the plane direction (Re) of 0.5 nm and a retardation in the thickness direction (Rth) of −150 nm. The TAC film itself had a negative uniaxiality and a retardation in the plane of −0.5 nm and a retardation in the thickness direction of +40 nm. Therefore, it was assessed that the liquid crystal layer itself had an Re of 0 nm and an Rth of −190 nm.

Furthermore, only the liquid crystal material portion was scrapped off from the optical film and the glass transition temperature thereof was measured using a DSC. As a result, it was found to be 100° C. The pencil hardness of the liquid crystal material surface of the film was on the order of 2H and thus it was confirmed that the film had a sufficient hardness.

Example 2

A liquid crystalline polymer represented by formula (9) below was synthesized by radical polymerization. With regard to the molecular weight in terms of polystyrene, Mn=6000 and Mw=12000.

A low molecular weight liquid crystalline compound having an oxetanyl group represented by formula (10) was synthesized.

In 9 ml of diethylene glycol dimethyl ether were dissolved 0.8 g of the polymer of formula (9) and 0.2 g of the compound of formula (10), followed by addition of 0.1 g of a propylene carbonate solution of 50 percent of triarylsulfonium hexafluoroantimonate (a reagent manufactured by Aldrich Co.) and a slight amount of a fluorine-based surfactant at a dark place and filtration of insolubles with a polytetrafluoroethylene filter with a pore size of 0.45 μm thereby preparing a liquid crystal material solution.

mJ/cm$^2$ (measured at 365 nm) using a high pressure mercury lamp thereby curing the liquid crystal material.

Since the polyethylene naphthalate film used as a substrate was large in birefringence and thus not preferable for an optical film, the resulting liquid crystal film on the alignment substrate was transferred via an ultraviolet curing type adhesive onto a polycarbonate film having a retardation of 140 nm in the plane direction. More specifically, the adhesive with a thickness of 5 μm was coated over the cured liquid crystal material layer on the polyethylene naphthalate film and laminated with a polycarbonate film. After the laminate was subjected to an irradiation of ultraviolet light from the polycarbonate film side so as to cure the adhesive, the PVA layer and polyethylene naphthalate film were released.

The resulting optical film (liquid crystal layer/adhesive layer/polycarbonate film) had a retardation in the plane (Re) of 140 nm and biaxiality. The liquid crystal layer itself was estimated to have an Rth of −120 when it was transferred to a TAC film having no anisotropy in the plane, as done in Example 1.

Two sheets of this liquid crystal film formed on the polycarbonate film were each arranged in a commercially avail-

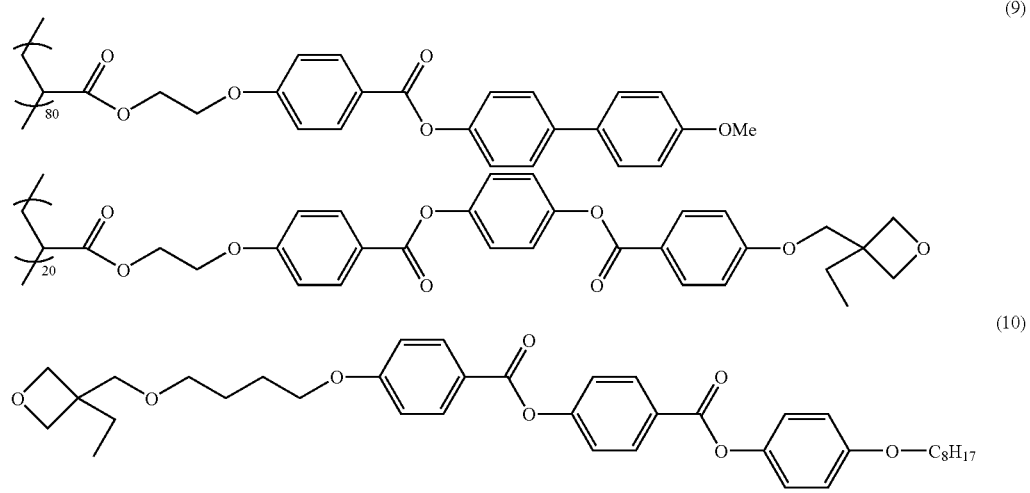

An alignment substrate was prepared as follows.

A polyethylene naphthalate film with a thickness of 50 μm (manufactured by Teijin Dupont Films Japan Ltd.) was cut into a size of 15 cm square and spin-coated with a solution of 5 percent by weight of an alkyl-modified polyvinyl alcohol (MP-102 manufactured by KURARAY CO., LTD.) (solvent is a mixed solvent of water and isopropyl alcohol at a weight ratio of 1:1). The coated film was dried on a hot plate kept at 50° C. for 30 minutes and heated at 150° C. in an oven for 5 minutes. The thickness of the resulting PVA layer was 0.8 μm. The PVA layer was rubbed with a rayon cloth. The peripheral velocity ratio (the moving velocity of the rubbing cloth/the moving velocity of the substrate film) was set to 10.

On the resulting alignment substrate was spin-coated the liquid crystal material solution obtained above. The coated alignment substrate was dried on a hot plate kept at 60° C. for 10 minutes and heated at 150° C. in an oven for 2 minutes thereby aligning the liquid crystal material. The sample was placed on an aluminum plate heated at 60° C., making contact therewith and irradiated with an ultraviolet light of 400 able IPS type liquid crystal television so as to be positioned between the upper polarizing film and the cell and between the lower polarizing film and the cell. As the result, it was found that the viewing angle was enlarged and a more excellent image was provided even when the television was viewed obliquely, compared with an IPS type television without the liquid crystal film.

As shown in FIG. 1, one sheet of this liquid crystal film formed on the polycarbonate film (optical film: homeotropic alignment liquid crystal film b and polycarbonate film c) was arranged in a commercially available IPS type liquid crystal television wherein a backlight f, a lower polarizing film e, an IPS type liquid crystal cell d, and an upper polarizing film a are laminated in this order, so as to be positioned between the upper polarizing film a and the liquid crystal cell d. As the result, it was found that the viewing angle was enlarged and a more excellent image was provided even when the television was viewed obliquely, compared with an IPS type television without the optical film.

Example 3

A liquid crystalline polymer represented by formula (11) below was synthesized. With regard to the molecular weight in terms of polystyrene, Mn=11000 and Mw=20000.

In 9 ml of cyclohexanone was dissolved 1.0 g of the polymer of formula (11), followed by addition of 0.05 g of a photo initiator SP-172 manufactured by ADEKA CORPORATION at a dark place and filtration of insolubles with a polytetrafluoroethylene filter with a pore size of 0.45 μm thereby preparing a liquid crystal material solution.

An alignment substrate was prepared as follows.

An N-methylpyrrolidone solution of 5 percent by weight of polyamide (η=0.4) represented by formula (12) below was spin-coated on a 0.7 mm thickness borosilicate glass of 15 cm square. The coated glass was dried on a hot plate kept at 80° C. for 30 minutes and heated at 120° C. in an oven for 10 minutes.

On the resulting alignment substrate was spin-coated the liquid crystal material solution obtained above. The coated alignment substrate was dried on a hot plate kept at 60° C. for 10 minutes and heated at 140° C. in an oven for 2 minutes thereby aligning the liquid crystal material. The sample was placed on an aluminum plate heated at 70° C., making contact therewith and irradiated with an ultraviolet light of 300 mJ/cm$^2$ (measured at 365 nm) using a high pressure mercury lamp thereby curing the liquid crystal material.

As a result of observation of the resulting optical film on the glass substrate through a polarizing microscope, it was confirmed that the film was aligned in a monodomain uniform homeotropic liquid crystal alignment having no disclination. The retardation (Rth) measured using KOBRA21ADH was −250 nm.

Example 4

On a cholesteric liquid crystal layer (thickness: 5 μm) exhibiting a circularly polarized dichroism in a spectrum of 400 to 700 nm, formed on a TAC film (thickness: 80 μm) was laminated the homeotropic alignment liquid crystal film obtained in Example 3 via a tacky adhesive layer (thickness: 25 μm) of an acrylic tacky adhesive. On the liquid crystal film was laminated a ¼ wavelength plate (retardation in the plane: 130 nm) (thickness: 60 μm) produced by stretching a polycarbonate film via a tacky adhesive layer (thickness: 25 μm) of the same acrylic tacky adhesive thereby producing a brightness enhancement film.

Figure 2:
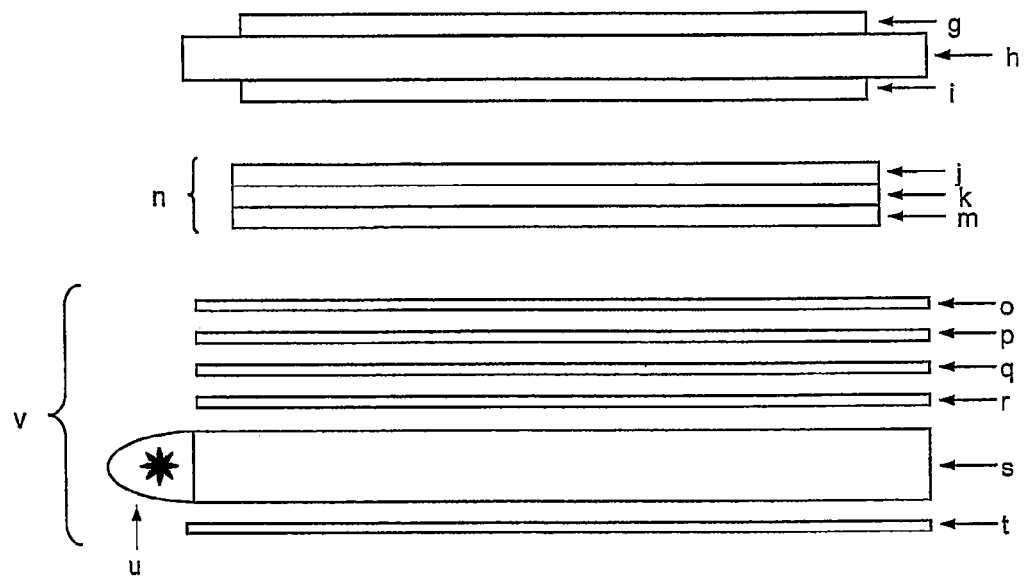
FIG. 2 is a conceptual view for illustrating the liquid crystal display devices used in Examples 4 and 7.

As shown in FIG. 2, the resulting brightness enhancement film n (cholesteric liquid crystal film m, homeotropic alignment liquid crystal film k, ¼ wavelength plate j) was arranged in a commercially available liquid crystal display wherein a backlight v, a lower polarizing film i, a liquid crystal cell h, and an upper polarizing film g were laminated in this order, so as to be positioned between the backlight v and the lower polarizing film i. As a result, it was found that a bright image enhanced by 30 percent was provided, compared with a liquid crystal display device with no brightness enhancement film n.

Example 5

An alignment substrate was prepared as follows.

A polyethylene terephthalate film with a thickness of 38 μm (manufactured by Toray Industries Inc.) was cut into a size of 15 cm square and spin-coated with a solution of 5 percent by weight of an alkyl-modified polyvinyl alcohol (MP-203 (PVA) manufactured by KURARAY CO., LTD.) (solvent is a mixed solvent of water and isopropyl alcohol at

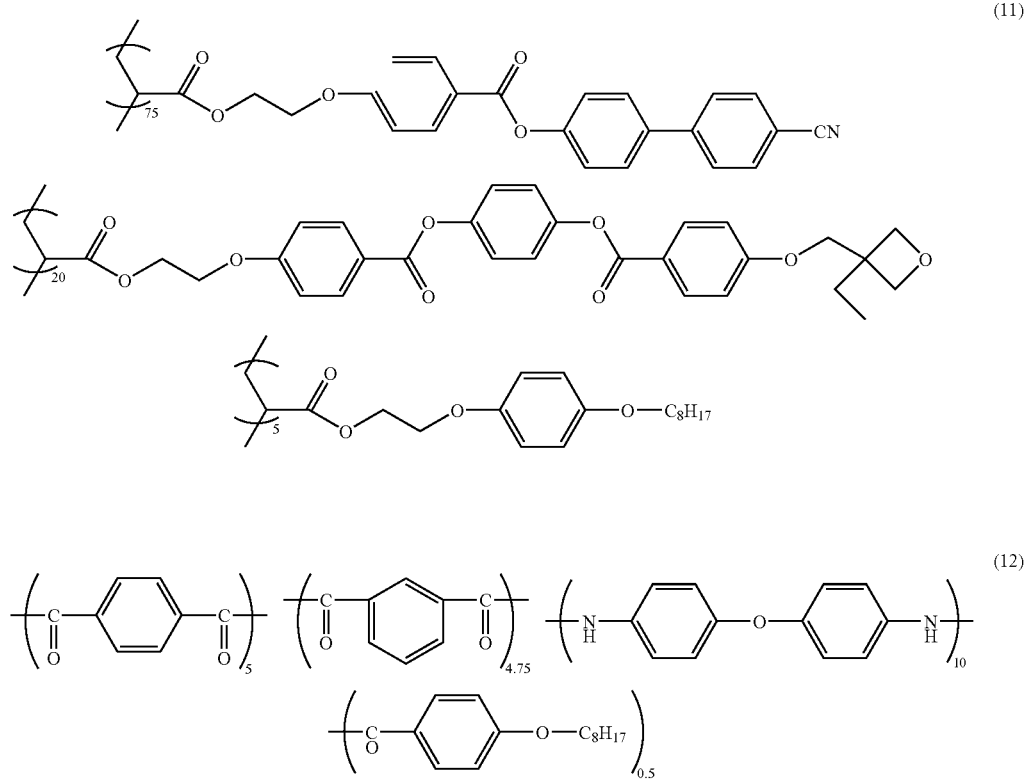

a weight ratio of 1:1). The coated film was dried on a hot plate kept at 50° C. for 30 minutes and heated at 120° C. in an oven for 10 minutes. The PVA layer was rubbed with a rayon cloth. The thickness of the resulting PVA layer was 1.2 μm. The peripheral velocity ratio (the moving velocity of the rubbing cloth/the moving velocity of the substrate film) was set to 4.

On the resulting alignment substrate was spin-coated the liquid crystal material solution prepared in Example 1. The coated alignment substrate was dried on a hot plate kept at 60° C. for 10 minutes and heated at 150° C. in an oven for 2 minutes thereby aligning the liquid crystal material. The sample was placed on an aluminum plate heated at 60° C., making contact therewith and irradiated with an ultraviolet light of 600 mJ/cm$^2$ (measured at 365 nm) using a high pressure mercury lamp thereby curing the liquid crystal material (thickness of the homeotropic alignment liquid crystal layer: 0.8 μm).

Since the polyethylene terephthalate film used as a substrate was large in birefringence and thus not preferable for an optical film, the resulting liquid crystal film on the alignment substrate was transferred via an ultraviolet curing type adhesive onto a triacetylcellulose (TAC) film. More specifically, the adhesive with a thickness of 5 μm was coated over the cured liquid crystal material layer on the polyethylene naphthalate film and laminated with a TAC film. After the laminate was subjected to an irradiation of ultraviolet light from the TAC film side so as to cure the adhesive, the polyethylene terephthalate film was released.

As a result of observation of the resulting optical film (PVA layer/liquid crystal layer/adhesive layer/TAC film) through a crossed nicols polarizing microscope, it was confirmed that the film was aligned in a monodomain uniform aligned state having no disclination. As a result of observation of the optical film through a conoscope, it was confirmed that the alignment was a homeotropic alignment having a positive uniaxial refraction structure. As a result of similar observation through a crossed nicols polarizing microscope of the film which was tilted and to which a light was made incident obliquely, it was confirmed that the light transmitted through the film. The optical retardation of the film was measured using KOBRA21ADH. A measuring light was made incident vertically or obliquely to the sample surface to obtain a chart of the optical retardation and incident angle of the measuring light. It was confirmed from the chart that the film was aligned homeotropically. In the homeotropic alignment, the retardation in the vertical direction to the sample surface (front retardation) is substantially zero. When the retardation of this sample was measured from an oblique direction to the slow axis direction of the liquid crystal layer, it was able to be determined that a homeotropic alignment was formed because the retardation value increases as the incident angle of the measuring light increases. From the foregoing, it was assessed that the homeotropic alignability of the liquid crystal layer was excellent.

The Nx1, Ny1 and Nz1 of the homeotropic alignment liquid crystal film were 1.54, 1.54 and 1.73, respectively.

Furthermore, only the liquid crystal material portion was scrapped off from the laminated film and the glass transition temperature thereof was measured using a DSC. As a result, it was found to be 100° C. The pencil hardness of the liquid crystal material surface of the film was on the order of 2H and thus it was confirmed that the film had a sufficient hardness.

The liquid crystal layer on the alignment substrate was transferred via an ultraviolet curing type adhesive onto a retardation film produced by stretching a polycarbonate film having a retardation in the plane direction of 140 nm (manufactured by Sumitomo Chemical Co., Ltd., thickness: 40 μm, Nx2: 1.5930, Ny2: 1.5887, Nz2: 1.5883). More specifically, the adhesive was coated over the cured liquid crystal material layer on the polyethylene terephthalate film and laminated with a polycarbonate film. After the laminate was subjected to an irradiation of ultraviolet light of 400 mJ/cm$^2$ from the polycarbonate film side so as to cure the adhesive, the PVA layer and polyethylene terephthalate film were released thereby obtaining a laminated retardation film wherein the homeotropic alignment liquid crystal layer and the polycarbonate stretched film were laminated according to the present invention.

The resulting laminated retardation film (homeotropic alignment liquid crystal film/adhesive layer/polycarbonate film) had a retardation in the plane (Re3) of 140 nm and biaxiality.

As shown in FIG. 1, one sheet of this laminated retardation film was arranged in a commercially available IPS type liquid crystal television wherein a backlight, a lower polarizing film, an IPS type liquid crystal cell, and an upper polarizing film are laminated in this order, so as to be positioned between the upper polarizing film and the liquid crystal cell. As the result, it was found that the viewing angle was enlarged and a more excellent image was provided even when the television was viewed obliquely, compared with an IPS type television without the laminated retardation film.

Example 6

An alignment substrate was prepared as follows.

A retardation film produced by stretching a polycarbonate film having a retardation in the plane direction of 140 nm (manufactured by Sumitomo Chemical Co., Ltd., thickness: 40 μm, Nx2: 1.5930, Ny2: 1.5887, Nz2: 1.5883) was cut into a size of 15 cm square and spin-coated with a solution of 5 percent by weight of an alkyl-modified polyvinyl alcohol (MP-203 (PVA) manufactured by KURARAY CO., LTD.) (solvent is a mixed solvent of water and isopropyl alcohol at a weight ratio of 1:1). The coated film was dried on a hot plate kept at 50° C. for 30 minutes and heated at 120° C. in an oven for 10 minutes. The PVA layer was rubbed with a rayon cloth. The thickness of the resulting PVA layer was 1.2 μm. The peripheral velocity ratio (the moving velocity of the rubbing cloth/the moving velocity of the substrate film) was set to 4.

On the resulting alignment substrate was spin-coated the liquid crystal material solution prepared in Example 1. The coated alignment substrate was dried on a hot plate kept at 60° C. for 10 minutes and heated at 150° C. in an oven for 2 minutes thereby aligning the liquid crystal material. The sample was placed on an aluminum plate heated at 60° C., making contact therewith and irradiated with an ultraviolet light of 600 mJ/cm (measured at 365 nm) using a high pressure mercury lamp so as to cure the liquid crystal material (the thickness of the homeotropic alignment liquid crystal layer: 0.8 μm) thereby obtaining a laminated retardation film wherein the homeotropic alignment liquid crystal film and the polycarbonate stretched film were laminated according to the present invention.

In order to confirm that the resulting liquid crystal layer formed an excellent homeotropic alignment, the liquid crystal layer on the liquid crystal layer/PVA layer/polycarbonate stretched film was transferred via an ultraviolet curing type adhesive onto a TAC film. More specifically, the adhesive with a thickness of 5 μm was coated over the cured liquid crystal material layer on the PVA layer and laminated with a TAC film. After the laminate was subjected to an irradiation of ultraviolet light from the TAC film side so as to cure the adhesive, the PVA/polycarbonate stretched film were released.

As a result of observation of the resulting laminated film (liquid crystal layer/adhesive layer/TAC film) through a crossed nicols polarizing microscope, it was confirmed that the film was aligned in a monodomain uniform aligned state having no disclination. As a result of observation of the optical film through a conoscope, it was confirmed that the alignment was a homeotropic alignment having a positive uniaxial refraction structure. As a result of similar observation through a crossed nicols polarizing microscope of the film which was tilted and to which a light was made incident obliquely, it was confirmed that the light transmitted through the film. The optical retardation of the film was measured using KOBRA21ADH. A measuring light was made incident vertically or obliquely to the sample surface to obtain a chart of the optical retardation and incident angle of the measuring light. It was confirmed from the chart that the film was aligned homeotropically. In the homeotropic alignment, the retardation in the vertical direction to the sample surface (retardation in the plane) is substantially zero. When the retardation of this sample was measured from an oblique direction to the slow axis direction of the liquid crystal layer, it was able to be determined that the homeotropic alignment was formed because the retardation value increases as the incident angle of the measuring light increases. From the foregoing, it was assessed that the homeotropic alignability of the liquid crystal layer was excellent.

The $Nx1$, $Ny1$ and $Nz1$ of the homeotropic alignment liquid crystal film were 1.54, 1.54 and 1.73, respectively.

Furthermore, only the liquid crystal material portion was scrapped off from the laminated film and the glass transition temperature thereof was measured using a DSC. As a result, it was found to be 100° C. The pencil hardness of the liquid crystal material surface of the film was on the order of 2H and thus it was confirmed that the film had a sufficient hardness.

The resulting laminated retardation film (homeotropic alignment liquid crystal layer/PVA layer/polycarbonate film) had a retardation in the plane (Re3) of 140 nm and biaxiality.

As shown in FIG. 1, one sheet of this laminated retardation film was arranged in a commercially available IPS type liquid crystal television wherein a backlight, a lower polarizing film, an IPS type liquid crystal cell, and an upper polarizing film are laminated in this order, so as to be positioned between the upper polarizing film and the liquid crystal cell. As the result, it was found that the viewing angle was enlarged and more excellent images was provided even when the television was viewed obliquely, compared with an IPS type television without the film similarly to Example 1.

Example 7

On a 5 μm thick cholesteric liquid crystal layer exhibiting a circularly polarized dichroism in a spectrum of 400 to 700 nm, formed on a TAC film (thickness: 80 μm) was laminated a 50 μm thickness retardation film wherein the homeotropic alignment liquid crystal film obtained in Example 1 and a retardation film of a polycarbonate stretched film (front retardation: 140 nm) via a tacky adhesive layer (thickness: 25 μm) of an acrylic tacky adhesive thereby preparing a brightness enhancement film according to the present invention.

As shown in FIG. 2, the resulting brightness enhancement film was arranged in a commercially available liquid crystal display wherein a backlight, a lower polarizing film, a liquid crystal cell, and an upper polarizing film are laminated in this order, so as to be positioned between the backlight and the lower polarizing film. As a result, it was found that a bright image enhanced by 30 percent was provided, compared with a liquid crystal display device with no brightness enhancement film.

Comparative Example 1

A solution was prepared by dissolving 5 parts by weight of a side chain liquid crystal polymer represented by formula (13) below (indicated in block polymer form for convenience, the numerals in the formula indicate the mol % of the monomer units, weight-average molecular weight: 5000), 20 parts by weight of a photo polymerizable liquid crystal compound exhibiting a nematic liquid crystal phase (Paliocolor LC242 manufactured by BASF Ltd.) and 5 parts by weight (the ratio based on the photo polymerizable liquid crystal compound) of a photo polymerization initiator (IRGACURE 907 manufactured by Ciba Specialty Chemicals) in 75 parts by weight of cyclohexanone. The solution was filtered to remove insolubles with a polytetrafluoroethylene filter with a pore size of 0.45 μm thereby preparing a liquid crystal material solution.

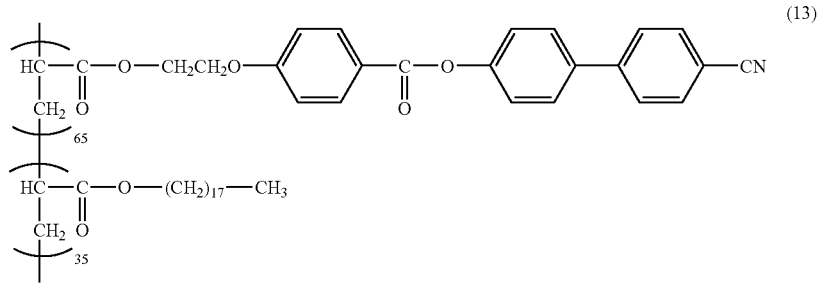

(13)

The resulting liquid crystal solution was spin-coated on an alignment substrate produced similarly in Example 1. The coated substrate was heated at 80° C. for 2 minutes and then cooled immediately to the room temperature thereby aligning homeotropically the liquid crystal material layer and vitrifying the layer, maintaining the alignment so as to fix the homeotropic alignment liquid crystal layer. The fixed homeotropic alignment liquid crystal layer was irradiated with an ultraviolet light thereby forming a homeotropic alignment liquid crystal film (thickness: 1.0 μm).

Only the liquid crystal material portion of the resulting homeotropic alignment liquid crystal film was scrapped off and the glass transition temperature thereof was measured using a DSC. As a result, it was found to be 80° C. The pencil hardness of the liquid crystal material surface of the film was on the order of 2B and thus it was confirmed that the film had a low hardness.

Example 8

An alignment substrate was prepared as follows.

A 38 μm thick polyethylene naphthalate film (manufactured by Toray Industries Inc.) was cut into a size of 15 cm square and spin-coated with a solution of 5 percent by weight of an alkyl-modified polyvinyl alcohol (MP-203 manufactured by KURARAY CO., LTD.) (solvent is a mixed solvent of water and isopropyl alcohol at a weight ratio of 1:1). The coated film was dried on a hot plate kept at 50° C. for 30 minutes and heated at 120° C. in an oven for 10 minutes. The PVA layer was rubbed with a rayon cloth. The thickness of the resulting PVA layer was 1.2 μm. The peripheral velocity ratio (the moving velocity of the rubbing cloth/the moving velocity of the substrate film) was set to 4.

On the resulting alignment substrate was spin-coated the liquid crystal material solution prepared in Example 1. The coated alignment substrate was dried on a hot plate kept at 60° C. for 10 minutes and heated at 150° C. in an oven for 2 minutes thereby aligning the liquid crystal material. The sample was placed on an aluminum plate heated at 60° C., making contact therewith and irradiated with an ultraviolet light of 600 mJ/cm$^2$ (measured at 365 nm) using a high pressure mercury lamp thereby curing the liquid crystal material.

Since the polyethylene naphthalate film used as a substrate was large in birefringence and thus not preferable for an optical film, the resulting liquid crystal film on the alignment substrate was transferred via an ultraviolet curing type adhesive onto a triacetylcellulose (TAC) film. More specifically, the adhesive with a thickness of 5 μm was coated over the cured liquid crystal material layer on the polyethylene naphthalate film and laminated with a TAC film. After the laminate was subjected to an irradiation of ultraviolet light from the TAC film side so as to cure the adhesive, the polyethylene naphthalate film was released.

As a result of observation of the resulting optical film (PVA layer/liquid crystal layer/adhesive layer/TAC film) through a polarizing microscope, it was confirmed that the film was aligned in a monodomain uniform aligned state having no disclination. As a result of observation of the optical film through a conoscope, it was confirmed that the alignment was a homeotropic alignment having a positive uniaxial refraction structure. As the result of measurement using KOBRA21ADH, the combination of the TAC film and the liquid crystal film was found to have a retardation in the plane direction (Re1) of 0.5 nm and a retardation in the thickness direction (Rth1) of −50 nm. The TAC film itself had a negative uniaxiality and a retardation in the plane of 0.5 nm and a retardation in the thickness of +40 nm. Therefore, it was assessed that the liquid crystal layer itself had an Re of 0.5 nm and an Rth of −90 nm.

Example 9

An optical film was prepared in accordance with the procedures of Example 8 except that the thickness of the homeotropic alignment liquid crystal film was changed to 1.0 μm. As the result of measurement using KOBRA21ADH, the combination of the TAC film and the liquid crystal layer was found to have a retardation in the plane direction (Re1) of 0.5 nm and a retardation in the thickness direction (Rth1) of −125 nm. The TAC film itself had a negative uniaxiality and a retardation in the plane of 0.5 nm and a retardation in the thickness direction of +40 nm. Therefore, it was assessed that the liquid crystal layer itself had an Re1 of 0.5 nm and an Rth1 of −165 nm.

Example 10

An optical film was prepared in accordance with the procedures of Example 8 except that the thickness of the homeotropic alignment liquid crystal film was changed to 0.9 μm. As the result of measurement using KOBRA21ADH, the combination of the TAC film and the liquid crystal layer was found to have a retardation in the plane direction (Re1) of 0.5 nm and a retardation in the thickness direction (Rth1) of −95 nm. The TAC film itself had a negative uniaxiality and a retardation in the plane of 0.5 nm and a retardation in the thickness direction of +40 mm. Therefore, it was assessed that the liquid crystal layer itself had an Re1 of 0.5 nm and an Rth1 of −135 nm.

Example 11

Figure 4:
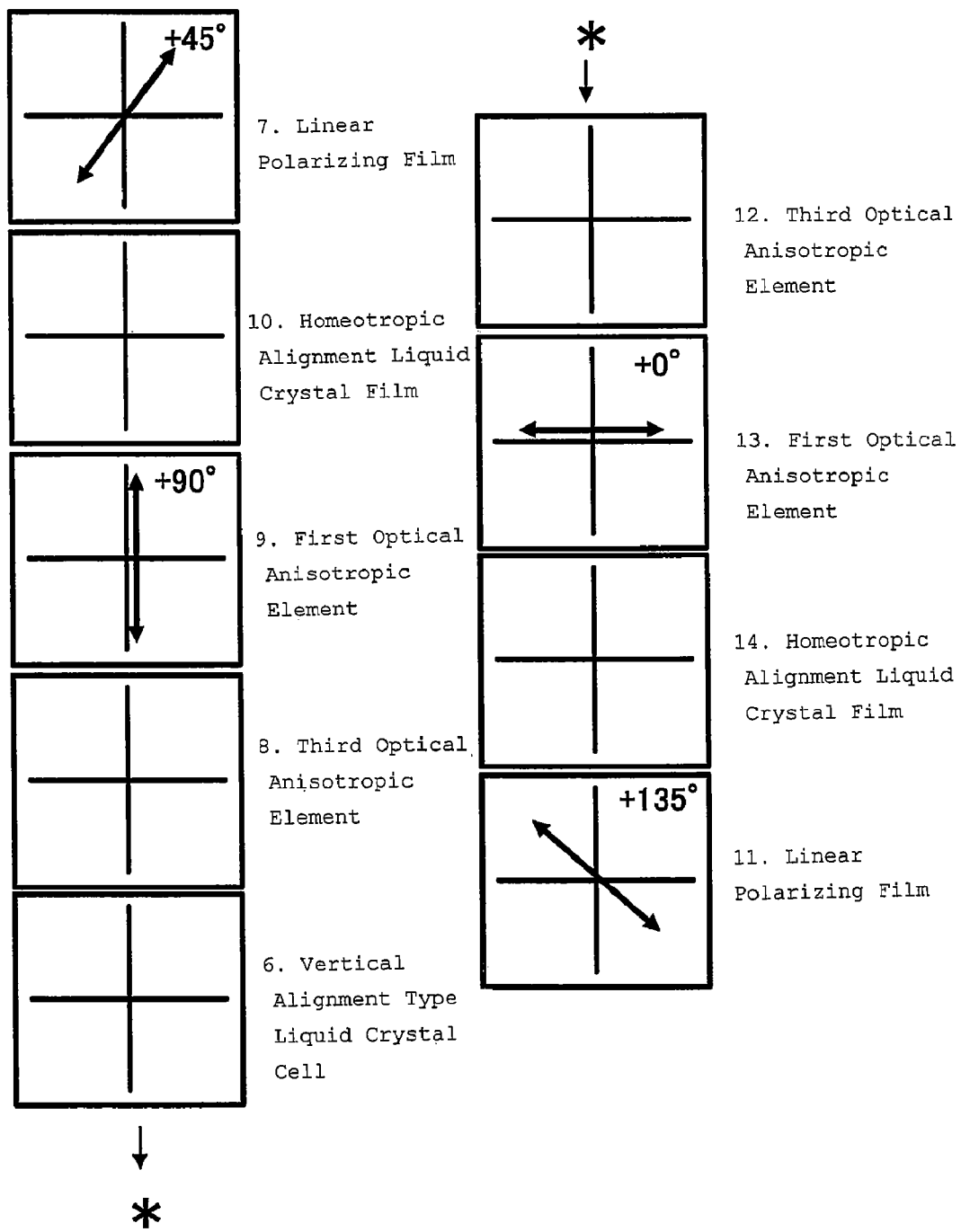
FIG. 4 is a plan view indicating the angular relations of each of the components of the vertical alignment type liquid crystal display of Example 8.

The vertical alignment type liquid crystal display device of Example 11 will be described with reference to FIGS. 3 and 4.

A transparent electrode 3 formed with an ITO layer with high transmissivity was formed on a substrate 1, and a counter electrode 4 was formed on a substrate 2. Between the transparent electrode 3 and the counter electrode 3 was sandwiched a liquid crystal layer 5 formed with a liquid crystal material exhibiting a negative dielectric anisotropy.

On the contacting surfaces between the liquid crystal layer 5 and the transparent electrode 3 and the counter electrode 4 were formed vertical alignment films (not shown), at least one of which had been subjected to an aligning treatment such as rubbing after being coated.

The liquid crystal molecules in the liquid crystal layer 5 had a tilt angle of 1 degree due to the alignment treatment such as rubbing on the alignment film.

Because of the use of the liquid crystal material exhibiting a negative dielectric anisotropy for the liquid crystal layer 5, the liquid crystal molecules tilted toward the parallel direction upon application of an electric voltage between the transparent electrode 3 and the counter electrode 4.

As the liquid crystal material for the liquid crystal layer 5 was used a liquid crystal material having a refractive index anisotropy wherein Ne (refractive index to extraordinary light)=1.561, No (refractive index to ordinary light)=1.478, and ΔN(Ne—No)=0.083.

A linear polarizing film 7 (thickness: about 180 μm, SQW-862 manufactured by Sumitomo Chemical Co., Ltd.) was arranged above the displaying side (upper side of the drawing) of the vertical alignment type liquid crystal cell 6. Between the upper linear polarizing film 7 and the liquid crystal cell 6 were arranged a third optical anisotropic element 8 (ARTON manufactured by JSR Corporation), a first optical anisotropic element (ZEONOR manufactured by ZEON CORPORATION), and the homeotropic alignment liquid crystal film 10 prepared in Example 8. A linear polarizing film 11 (thickness: about 180 μm, SQW-862 manufactured by Sumitomo Chemical Co., Ltd.) was arranged below the rear side (lower side of the drawing) of the vertical alignment type liquid crystal cell 6. Between the lower linear polarizing film 11 and the liquid crystal cell 6 were arranged another third optical anisotropic element 12 (ARTON manufactured by JSR Corporation), another first optical anisotropic element 13 (ZEONOR manufactured by ZEON CORPORATION), and the homeotropic alignment liquid crystal film 14 prepared in Example 1.

The first optical anisotropic elements 9, 13 were each formed with an optical element having an optical axis in the plane and a positive uniaxial optical anisotropy. The absorption axis orientations of the linear polarizing films 7, 11 were set to 45 degrees and 135 degrees in the plane, respectively, as indicated by arrows in FIG. 4. The slow axis orientations of the first optical anisotropic elements 9, 13 were set to 90 degrees and 0 degree, respectively, as indicated by arrows in FIG. 4, and they had a retardation in the plane Re2 of 137.5 nm.

The third optical anisotropic elements 8, 12 had each a retardation in the plane Re4 of substantially zero nm and a retardation in the thickness of 130 nm.

The homeotropic alignment liquid crystal films 10, 14 had each a retardation in the plane Re1 of 0.5 nm and a retardation in the thickness Rth1 of −50 nm.

Figure 5:
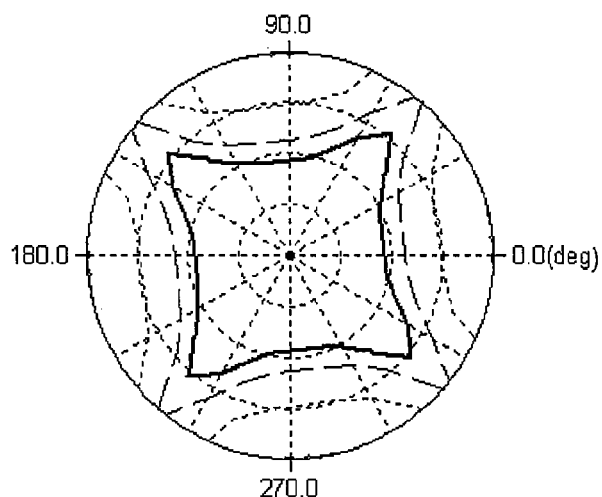
FIG. 5 is a view indicating the contrast ratio when viewing the vertical alignment type liquid crystal display of Example 8 from all the directions.

FIG. 5 shows the contrast ratio from all the directions defined by the transmissivity ratio of black image 0V and white image 5V "(white image)/(black image)". The concentric circles indicate same viewing angles and each of the intervals between the circles indicates 20 degrees. Therefore, the outermost circle indicates 80 degrees.

Example 12

Figure 6:
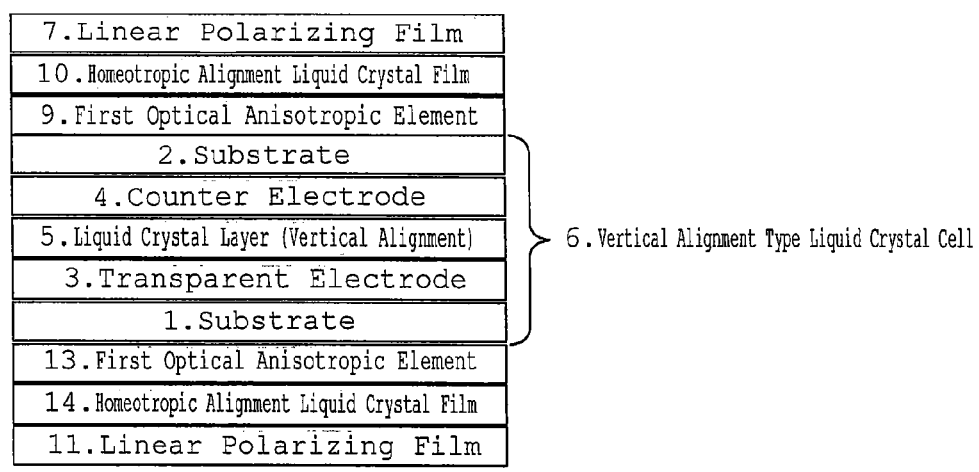
FIG. 6 is a schematic cross-sectional view of the vertical alignment type liquid crystal display of Example 9.

The vertical alignment type liquid crystal display device of Example 12 will be described with reference to FIGS. 6 and 7.

The vertical alignment type liquid crystal display device was produced in accordance with the procedures of Example 11 except that the first optical anisotropic elements 9, 13 (ZEONOR manufactured by ZEON CORPORATION) used in Example 11 were converted to those having a negative optical anisotropy using the homeotropic alignment liquid crystal film prepared in Example 9 and the third optical anisotropic elements 8, 12 were excluded.

Figure 7:
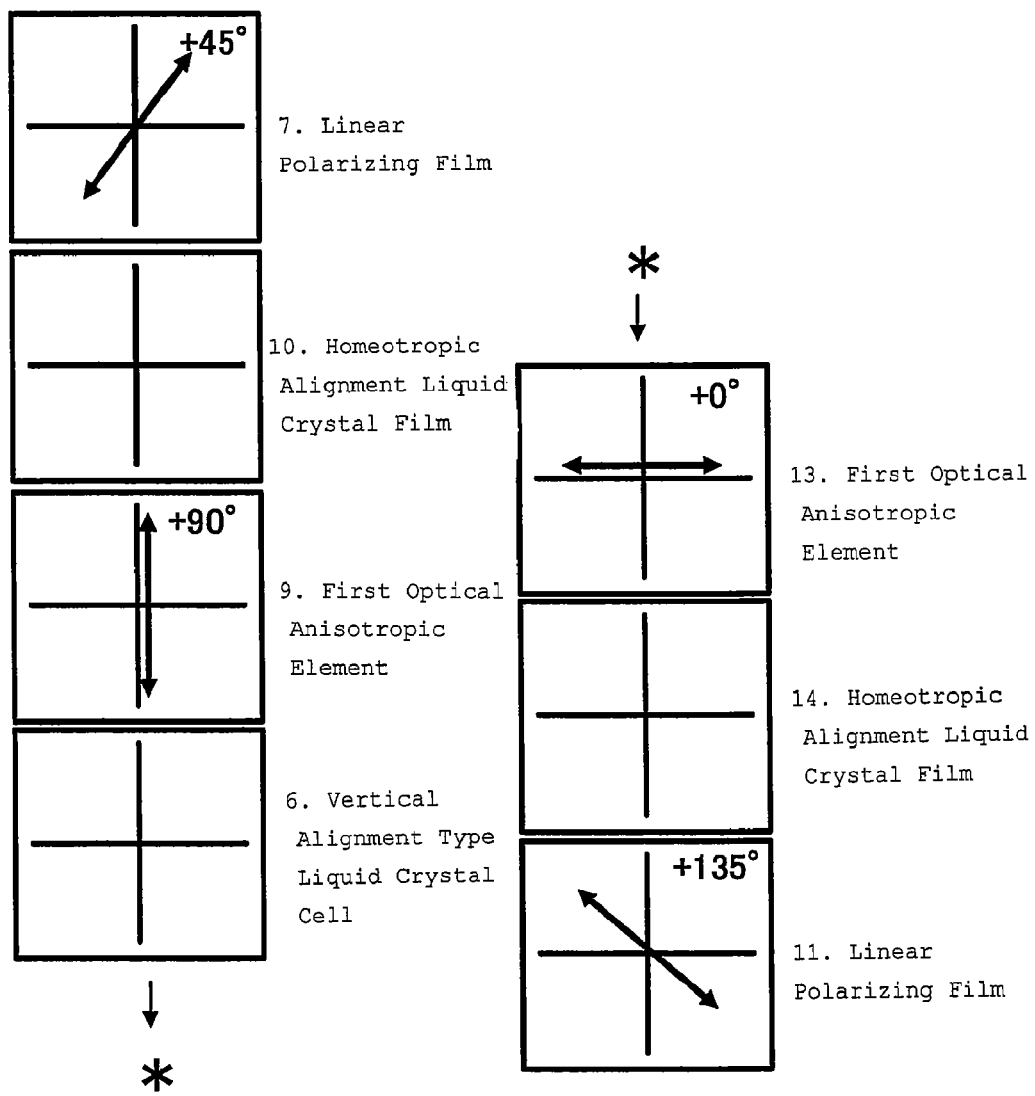
FIG. 7 is a plan view indicating the angular relations of each of the components of the vertical alignment type liquid crystal display of Example 9.

The absorption axis orientations of the linear polarizing films 7, 11 were set to 45 degrees and 135 degrees in the planes, respectively, as indicated by arrows in FIG. 7. The slow axis orientations of the first optical anisotropic elements 9, 13 were set to 90 degrees and 0 degree, respectively, as indicated by arrows in FIG. 7, and they had a retardation in the plane Re2 of 137.5 nm wherein the NZ coefficient=2.5.

The homeotropic alignment liquid crystal films 10, 14 had each a retardation in the plane Re1 of 0.5 nm and a retardation in the thickness Rth1 of −125 nm.

FIG. 8 shows the contrast ratio from all the directions defined by the transmissivity ratio of black image 0V and white image 5V "(white image)/(black image)". The concentric circles indicate same viewing angles and each of the intervals between the circles indicates 20 degrees. Therefore, the outermost circle indicates 80 degrees.

Example 13

Figure 10:
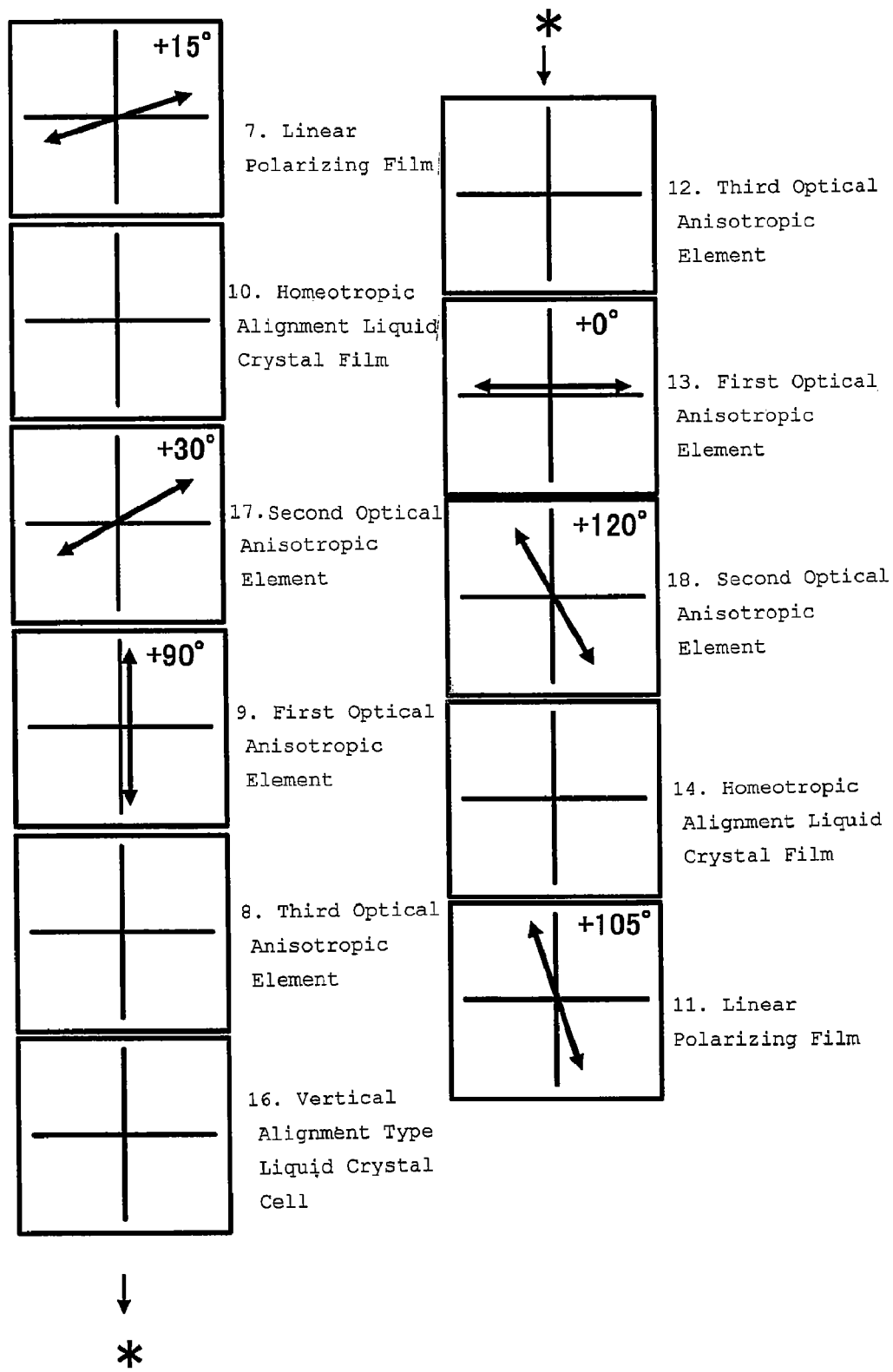
FIG. 10 is a plan view indicating the angular relations of each of the components of the transflective vertical alignment type liquid crystal display of Example 10.

The vertical alignment type liquid crystal display device of Example 13 will be described with reference to FIGS. 9 and 10.

A reflective electrode 15 formed with an Al layer with high reflectivity and a transparent electrode formed with an ITO layer with high transmissivity were formed on a substrate 1, and a counter electrode 4 was formed on a substrate 2. Between the reflective and transparent electrodes 15, 3 and the counter electrode 4 was sandwiched a liquid crystal layer 5 formed from a liquid crystal material exhibiting a negative dielectric anisotropy.

On the contacting surfaces between the liquid crystal layer 5 and the reflective and transparent electrodes 15, 3 and the counter electrode 4 were formed vertical alignment films (not shown), at least one of which had been subjected to a aligning treatment such as rubbing after being coated.

The liquid crystal molecules in the liquid crystal layer 5 had a tilt angle of 1 degree due to the alignment treatment such as rubbing on the alignment film.

Because of the use of the liquid crystal material exhibiting a negative dielectric anisotropy for the liquid crystal layer 5, the liquid crystal molecules tilted toward the parallel direction upon application of an electric voltage between the reflective and transparent electrodes 15, 3 and the counter electrode 4.

As the liquid crystal material for the liquid crystal layer 5 was used the same material as that used in Example 10.

A linear polarizing film 7 (thickness: about 180 μm, SQW-862 manufactured by Sumitomo Chemical Co., Ltd.) was arranged above the displaying side (upper side of the drawing) of the vertical alignment type liquid crystal cell 16. Between the upper linear polarizing film 7 and the liquid crystal cell 16 were arranged a third optical anisotropic element 8 (ARTON manufactured by JSR Corporation), a first optical anisotropic element 9 (ZEONOR manufactured by ZEON CORPORATION), a second optical anisotropic element 17 (ZEONOR manufactured by ZEON CORPORATION) and the homeotropic alignment liquid crystal film 10 prepared in Example 10. A linear polarizing film 11 (thickness: about 180 μm, SQW-862 manufactured by Sumitomo Chemical Co., Ltd.) was arranged below the rear side (lower side of the drawing) of the vertical alignment type liquid crystal cell 16. Between the lower linear polarizing film 11 and the liquid crystal cell 16 were arranged another third optical anisotropic element 12 (ARTON manufactured by JSR Corporation), another first optical anisotropic element 13 (ZEONOR manufactured by ZEON CORPORATION), another second optical anisotropic element 18 (ZEONOR manufactured by ZEON CORPORATION) and the homeotropic alignment liquid crystal film 14 prepared in Example 10.

The first optical anisotropic elements 9, 13 and second optical anisotropic elements 17, 18 were each formed with an optical element having an optical axis in the plane and a positive uniaxial anisotropy. The absorption axis orientations of the linear polarizing films 7, 11 are set to 15 degrees and 105 degrees in the planes, respectively, as indicated by arrows in FIG. 10. The slow axis orientations of the first optical anisotropic elements 9, 13 were set to 90 degrees and 0 degree, respectively, as indicated by arrows in FIG. 10, and they had a retardation in the plane Re2 of 137.5 nm. The slow axis orientations of the second optical anisotropic elements 17, 18 were set to 30 degrees and 120 degrees, respectively, as indicated by arrows in FIG. 10, and they had a retardation in the plane Re3 of 275 nm.

The third optical anisotropic elements 8, 12 had a retardation in the plane Re4 of substantially zero nm and a retardation in the thickness Rth of 105 nm.

The homeotropic alignment liquid crystal films 10, 14 had each a retardation in the plane Re1 of 0.5 nm and a retardation in the thickness Rth1 of −95 nm.

Figure 11:
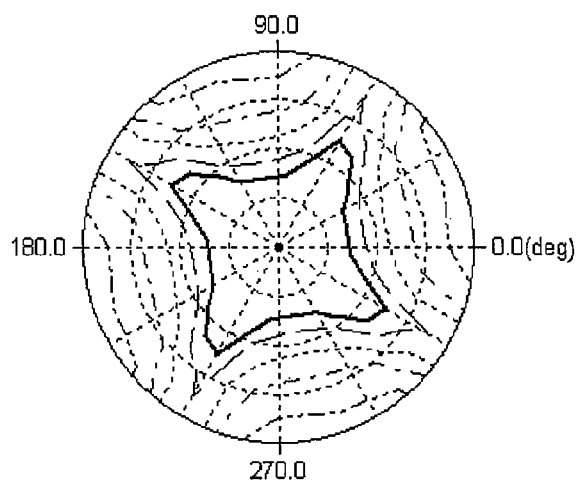
FIG. 11 is a view indicating the contrast ratio when viewing the transflective vertical alignment type liquid crystal display of Example 10 from all the directions.

FIG. 11 shows the contrast ratio from all the directions defined by the transmissivity ratio of black image 0V and white image 5V "(white image)/(black image)". The concentric circles indicate same viewing angles and each of the intervals between the circles indicates 20 degrees. Therefore, the outermost circle indicates 80 degrees.

Comparative Example 2

Figure 12:
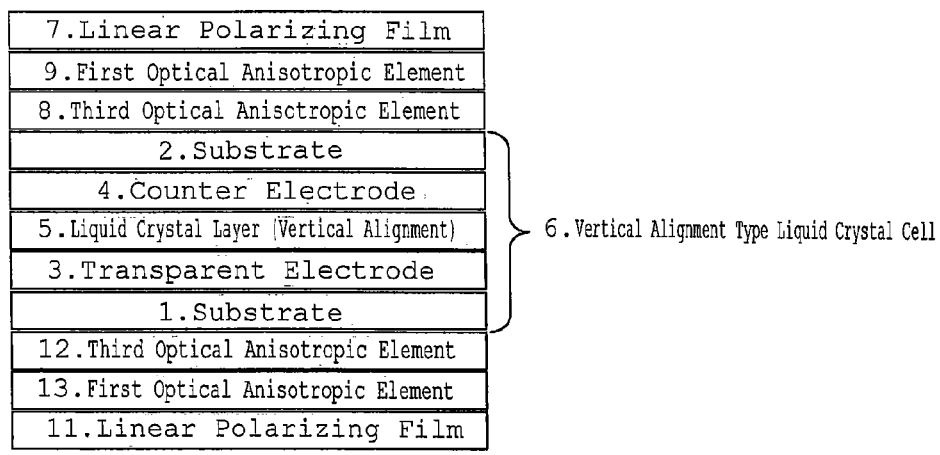
FIG. 12 is a schematic cross-sectional view of the vertical alignment type liquid crystal display of Comparative Example 2.

The vertical alignment type liquid crystal display device shown in FIG. 12 was prepared in accordance with the procedures of Example 11 except that the homeotropic alignment liquid crystal films 10, 14 were not used.

Figure 13:
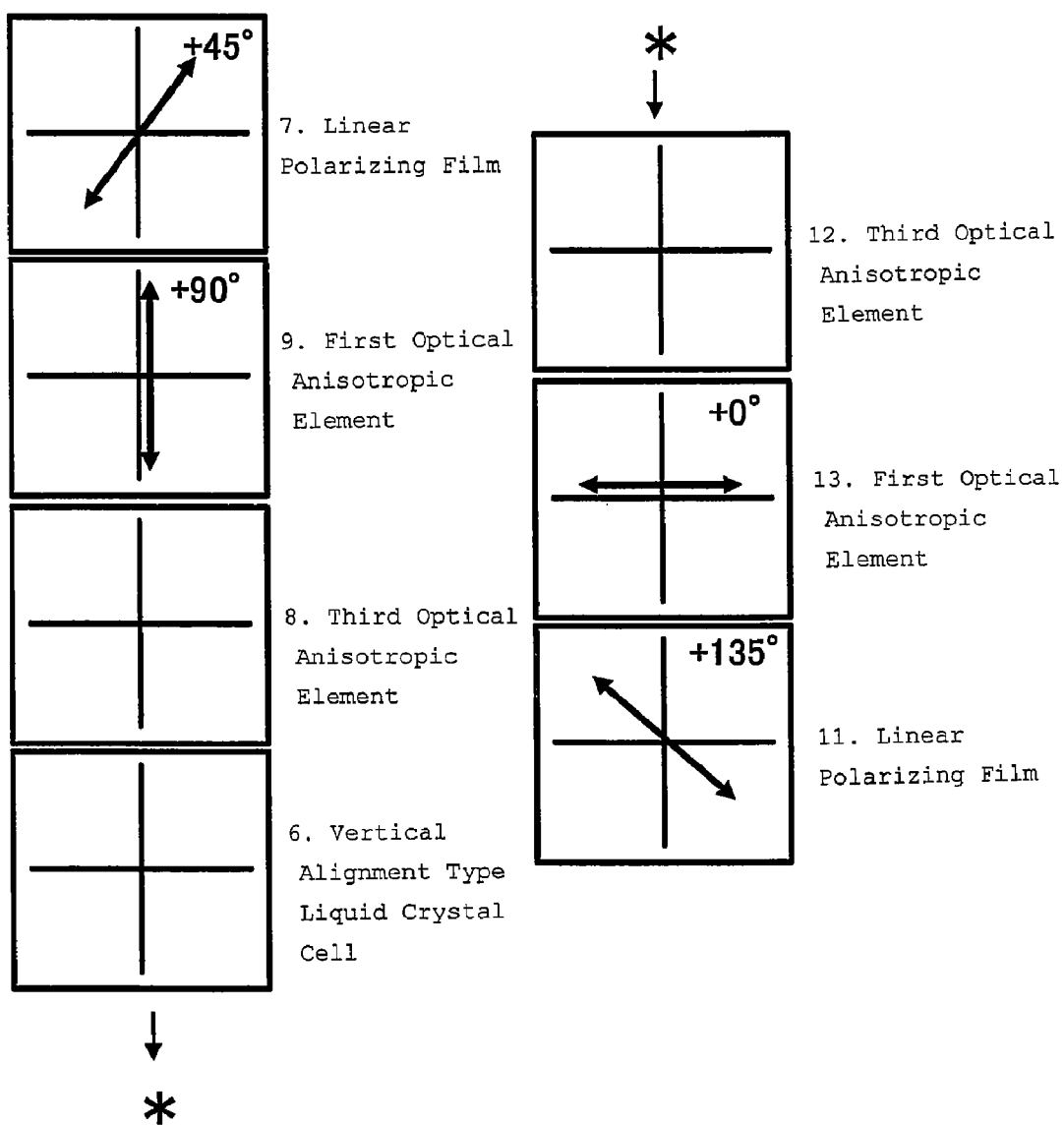
FIG. 13 is a plan view indicating the angular relations of each of the components of the vertical alignment type liquid crystal display of Comparative Example 2.

FIG. 13 shows the angle relation in each component.

Figure 14:
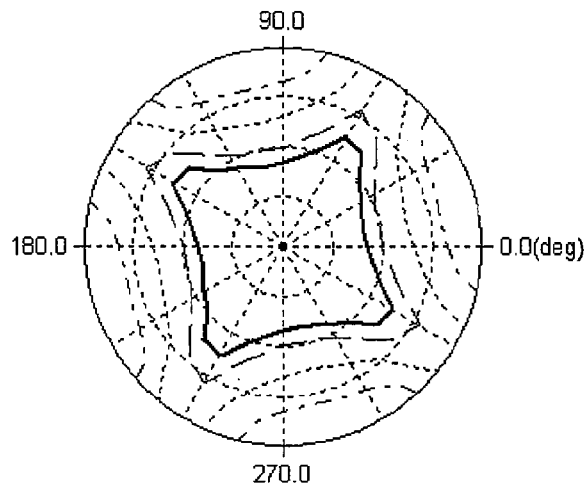
FIG. 14 is a view indicating the contrast ratio when viewing the vertical alignment type liquid crystal display of Comparative Example 2 from all the directions.

FIG. 14 shows the contrast ratio from all the directions defined by the transmissivity ratio of black image 0V and white image 5V "(white image)/(black image)". The concentric circles indicate same viewing angles and each of the intervals between the circles indicates 20 degrees. Therefore, the outermost circle indicates 80 degrees.

From the comparison between the contrast contours in the all direction shown in FIGS. 5 and 8 and those in FIG. 14, it was found that wider viewing characteristics was able to be obtained when using the homeotropic alignment liquid crystal films.

Comparative Example 3

Figure 15:
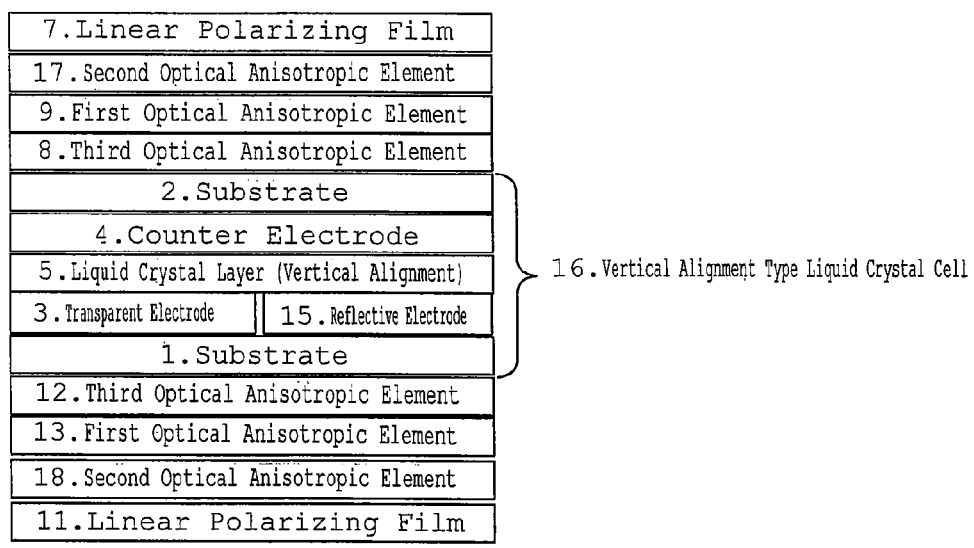
FIG. 15 is a schematic cross-sectional view of the transflective vertical alignment type liquid crystal display of Comparative Example 3.

The transflective vertical alignment type liquid crystal display device shown in FIG. 15 was prepared in accordance with the procedures of Example 13 except that the homeotropic alignment liquid crystal films 10, 14 were not used.

Figure 16:
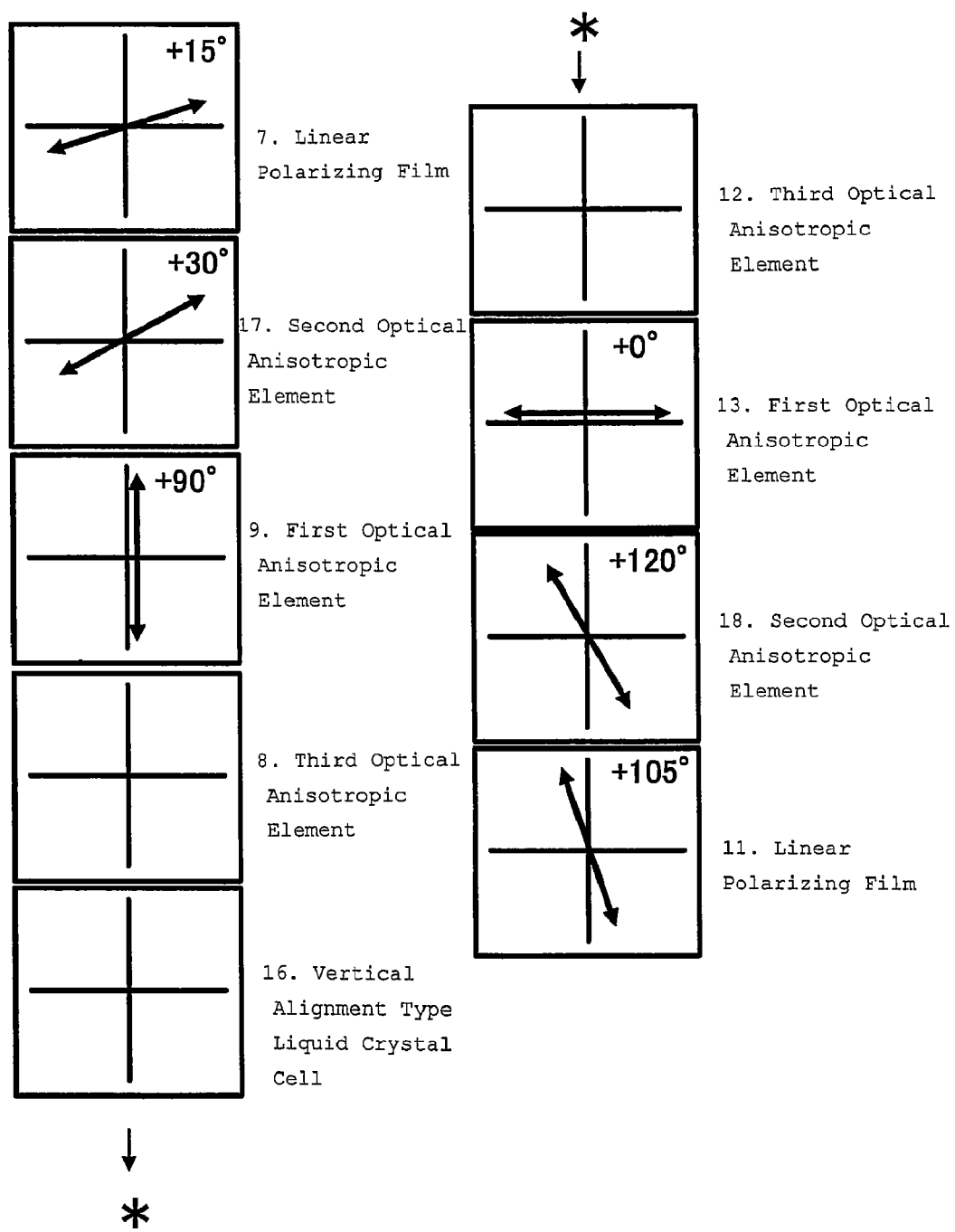
FIG. 16 is a plan view indicating the angular relations of each of the components of the transflective vertical alignment type liquid crystal display of Comparative Example 3.

FIG. 16 shows the angle relation in each component.

Figure 17:
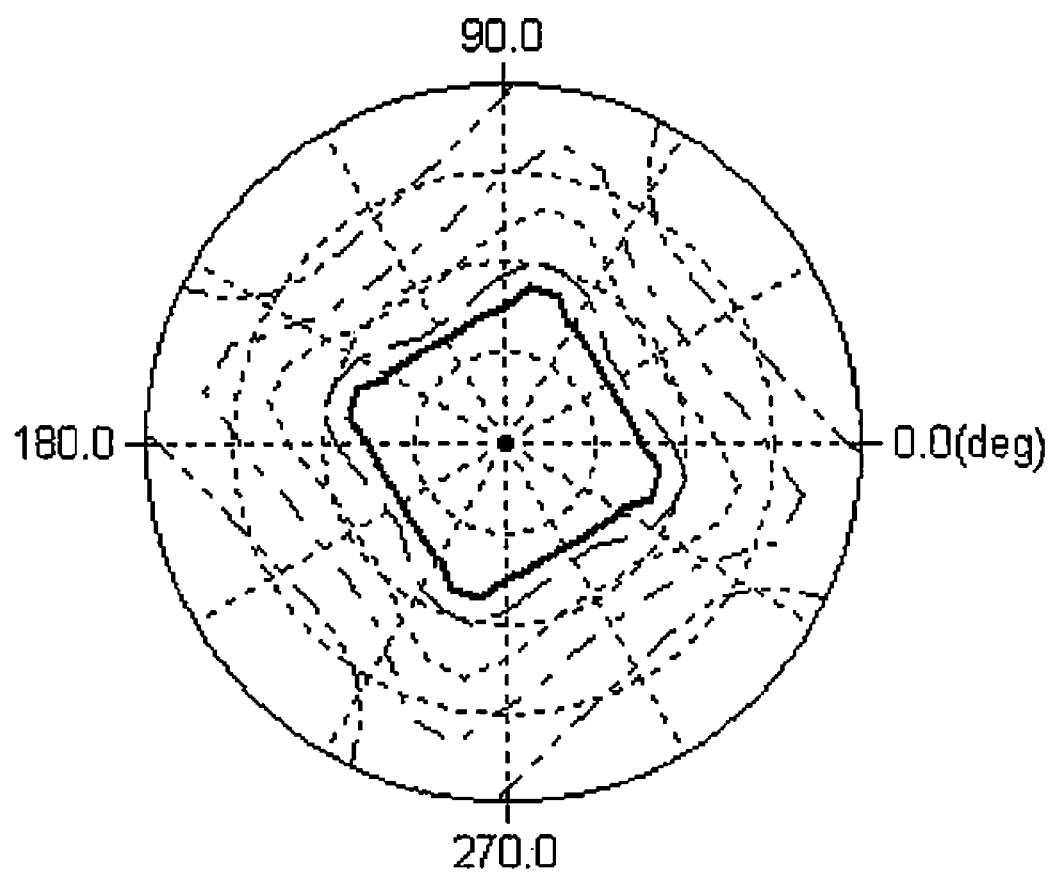
FIG. 17 is a view indicating the contrast ratio when viewing the transflective vertical alignment type liquid crystal display of Comparative Example 3 from all the directions.

FIG. 17 shows the contrast ratio from all the directions defined by the transmissivity ratio of black image 0V and white image 5V "(white image)/(black image)". The concentric circles indicate same viewing angles and each of the intervals between the circles indicates 20 degrees. Therefore, the outermost circle indicates 80 degrees.

From the comparison between the contrast contours in the all direction shown in FIG. 11 and those in FIG. 17, it was found that wider viewing characteristics was able to be obtained when using the homeotropic alignment liquid crystal films.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A laminated retardation film comprising a liquid crystal layer comprising a liquid crystalline substance containing a side chain liquid crystalline compound having an oxetanyl group, as a constituent, aligned homeotropically on an alignment substrate while the substance is in a liquid crystal state and fixed in the homeotropic alignment by allowing the oxetanyl group to react, and a stretched film with a retardation function integrally laminated on the liquid crystal film, the laminated retardation film satisfying the following requirements:

$$0 \text{ nm} \leq Re1 \leq 50 \text{ nm} \qquad [3]$$

$$-500 \text{ nm} \leq Rth1 \leq -30 \text{ nm} \qquad [4]$$

$$30 \text{ nm} \leq Re2 \leq 500 \text{ nm} \qquad [5]$$

$$30 \text{ nm} \leq Rth2 \leq 200 \text{ nm} \qquad [6]$$

wherein Re1 and Re2 indicate the retardation values in the plane of the homeotropic alignment liquid crystal layer and in the plane of the stretched film with a retardation function, respectively, Rth1 and Rth2 indicate the retardation values in the thickness direction of the homeotropic alignment liquid crystal layer and in the thickness direction of the stretched film with a retardation, respectively, and Re1, Re2, Rth1, and Rth2 are defined by Re1=(Nx1−Ny1)×d1 [nm], Re2=(Nx2−Ny2)×d2 [nm], Rth1=(Nx1−Nz1)×d1 [nm], and Rth2=(Nx2−Nz2)×d2 [nm], respectively, wherein d1 and d2 indicate the thickness of the homeotropic alignment liquid crystal layer and the thickness of the stretched film with a retardation function, respectively, Nx1 and Ny1 indicate the main refractive indices in the plane of the homeotropic alignment liquid crystal layer, Nx2 and Ny2 indicate the main refractive indices in the plane of the stretched film with a retardation function, Nz1 and Nz2 indicate the main refractive indices in the thickness direction of the homeotropic alignment liquid crystal layer and in the thickness direction of the stretched film with a retardation function, and Nz1>Nx1≧Ny1 and Nx2>Ny2.

2. A brightness enhancement film comprising the laminated retardation film according to claim 1, where the stretched film with a retardation function has a retardation value in the plane (Re2) within the range of 100 to 170 nm and at least one cholesteric liquid crystal film laminated on the laminated retardation film.

3. An image display device comprising the laminated retardation film according to claim 1.

* * * * *